US012596581B1

(12) United States Patent
Abdulrahman

(10) Patent No.: US 12,596,581 B1
(45) Date of Patent: Apr. 7, 2026

(54) APPARATUS AND METHOD FOR DETERMINING A QUANTITY OF DUAL-KEY ENTITLEMENTS TO ASSIGN TO AT LEAST A RESOURCE

(71) Applicant: PARK POINT W.L.L, Sanabis (BH)

(72) Inventor: Omar Abdulrahman, Sanabis (BH)

(73) Assignee: PARK POINT W.L.L, Sanabis (BH)

( * ) Notice: Subject to any disclaimer, the term of this patent is extended or adjusted under 35 U.S.C. 154(b) by 0 days.

(21) Appl. No.: 19/329,895

(22) Filed: Sep. 16, 2025

(51) Int. Cl.
  *G06F 9/50*  (2006.01)
  *G06F 21/00*  (2013.01)

(52) U.S. Cl.
  CPC .................................. *G06F 9/5038* (2013.01)

(58) Field of Classification Search
  CPC ........ G06F 9/5038; G06F 9/50; G06F 9/5022; G06F 21/604; G06F 21/62; G06F 21/6218; G06F 21/629; H04L 9/08; H04L 9/088
  See application file for complete search history.

(56) References Cited

U.S. PATENT DOCUMENTS

| | | | |
|---|---|---|---|
| 2010/0293098 A1* | 11/2010 | Kudelski | ............ H04N 21/4623 |
| | | | 705/64 |
| 2016/0110698 A1 | 4/2016 | Howe | |
| 2020/0219074 A1 | 7/2020 | Vossoughi | |
| 2024/0054518 A1 | 2/2024 | Saravia et al. | |

FOREIGN PATENT DOCUMENTS

CN        113643447 A      11/2021

* cited by examiner

*Primary Examiner* — Edward Zee
(74) *Attorney, Agent, or Firm* — CALDWELL LLC

(57) ABSTRACT

An apparatus and method for determining a quantity of dual-key entitlements to assign to at least a resource. The apparatus includes at least a processor and a memory communicatively connected to the at least a processor. The memory instructs the processor to instantiate, using the at least a processor, a configurable governance layer comprising a plurality of configurable parameters, wherein at least an entity of a plurality of entities access the configurable governance layer using an entity profile and configure the plurality of configurable parameters, receive, using the at least a processor, an assignment from one or more entities, wherein the assignment comprises at least validation data associated with the at least a resource and entity protocols associated with the entity, determine, using the at least a processor, a quantity of dual-key entitlements to assign to the at least a resource based on the assignment and the entity protocols.

20 Claims, 14 Drawing Sheets

300b

Operator Control Center
Manage governance across all tenants and entities.

| Overview | Tenants | Global Rules | Analytics |

+ Add New Global Rule

| Tenant Name | Status | Members | Active Rules | Last Activity | Actions |
|---|---|---|---|---|---|
| Acme Corp. | Active | 150 | 8 | 2025-08-08 | Edit |
| TechStart Inc | Active | 45 | 5 | 2025-08-10 | Edit |
| Global Finance | Suspended | 200 | 12 | 2025-02-03 | Edit |
| Crypto Ventures | Pending | 25 | 3 | 2025-09-08 | Edit |

Acme Corp Dashboard
Manage your entity governance and member parameters.

| Overview | Members | Rules | Compliance |

+ Add New Rule

| Member ID | Account Type | Last Activity | Status | Key Usage | Action |
|---|---|---|---|---|---|
| USR-2024-001 | Enterprise | 2025-08-08 | Active | 7500/10000 | Edit |
| USR-2024-002 | Premium | 2025-08-10 | Active | 2100/5000 | Edit |
| USR-2024-003 | Standard | 2025-02-03 | Inactive | 480/500 | Edit |
| USR-2024-004 | Standard | 2025-09-08 | Active | 150/500 | Edit |

FIG. 4B

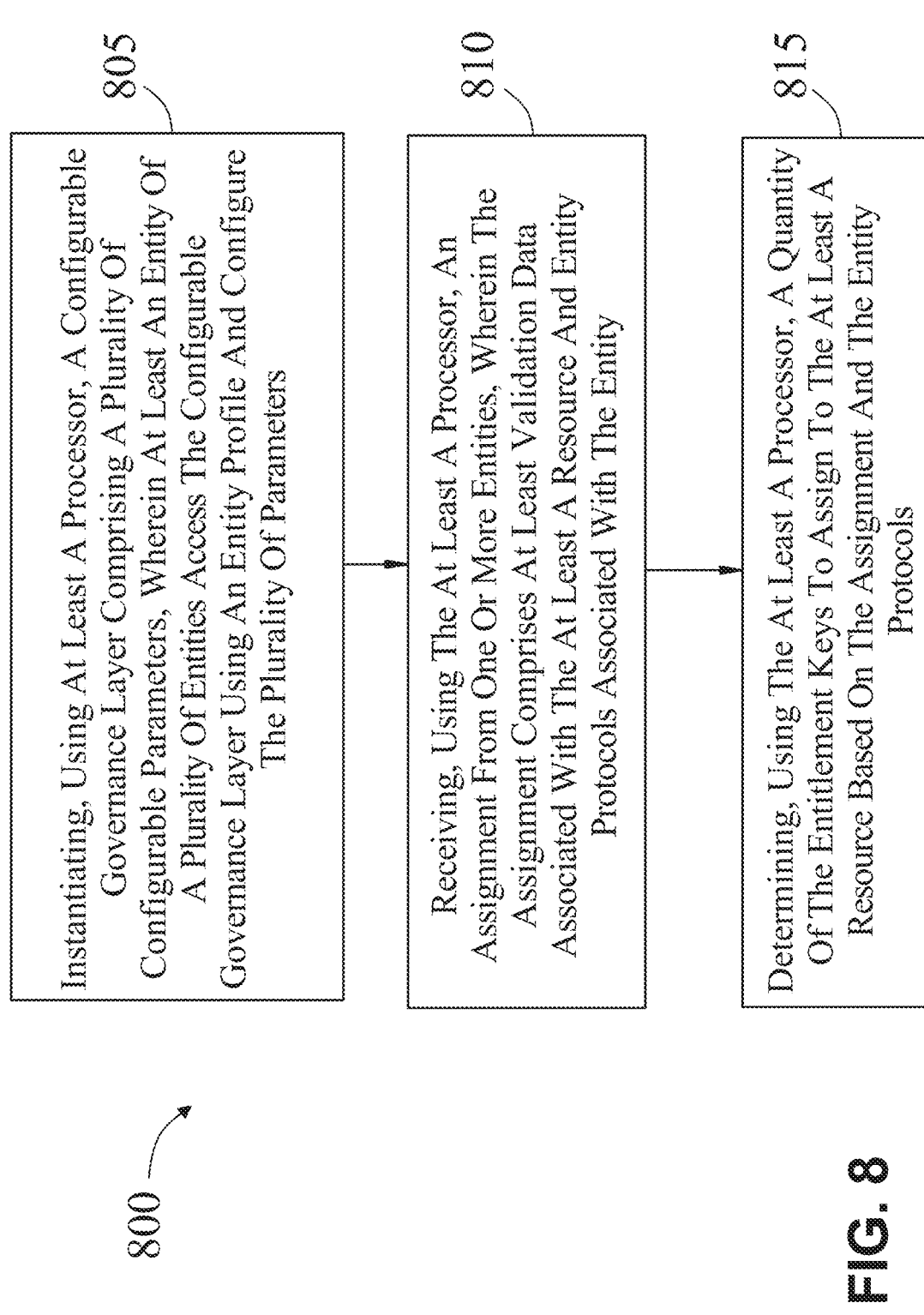

805

Instantiating, Using At Least A Processor, A Configurable Governance Layer Comprising A Plurality Of Configurable Parameters, Wherein At Least An Entity Of A Plurality Of Entities Access The Configurable Governance Layer Using An Entity Profile And Configure The Plurality Of Parameters

810

Receiving, Using The At Least A Processor, An Assignment From One Or More Entities, Wherein The Assignment Comprises At Least Validation Data Associated With The At Least A Resource And Entity Protocols Associated With The Entity

815

Determining, Using The At Least A Processor, A Quantity Of The Entitlement Keys To Assign To The At Least A Resource Based On The Assignment And The Entity Protocols

APPARATUS AND METHOD FOR DETERMINING A QUANTITY OF DUAL-KEY ENTITLEMENTS TO ASSIGN TO AT LEAST A RESOURCE

FIELD OF THE INVENTION

The present invention generally relates to the field of entitlement management systems. In particular, the present invention is directed to an apparatus and a method for determining a quantity of dual-key entitlements to assign to at least a resource.

BACKGROUND

Conventional entitlement and validation systems may encounter issues such as uncontrolled distribution of digital keys, limited capability for real-time adjustment, and restricted system monitoring. Existing implementations may not synchronize processor-executed governance rules with dynamically changing input data streams associated with entities, resources, and protocols. These conditions can result in data inconsistencies, unauthorized resource consumption, and processing delays that increase computational load and reduce overall system efficiency.

SUMMARY OF THE DISCLOSURE

In an aspect, an apparatus for determining a quantity of dual-key entitlements to assign to at least a resource includes at least a processor and a memory communicatively connected to the at least a processor. The memory contains instructions configuring the processor to instantiate, using the at least a processor, a configurable governance layer comprising a plurality of configurable parameters, wherein at least an entity of a plurality of entities access the configurable governance layer using an entity profile and configure the plurality of configurable parameters, receive, using the at least a processor, an assignment from one or more entities, wherein the assignment comprises at least validation data associated with the at least a resource and entity protocols associated with the entity, determine, using the at least a processor, a quantity of dual-key entitlements to assign to the at least a resource based on the assignment, the entity protocols, and at least a configurable parameter of the plurality of configurable parameters of the governance layer.

In another aspect, a method for determining a quantity of dual-key entitlements to assign to at least a resource includes instantiating, using at least a processor, a configurable governance layer comprising a plurality of configurable parameters, wherein at least an entity of a plurality of entities access the configurable governance layer using an entity profile, and configure the plurality of configurable parameters, receiving, using the at least a processor, an assignment from one or more entities, wherein the assignment comprises at least validation data associated with the at least a resource and entity protocols associated with the entity, determining, using the at least a processor, a quantity of dual-key entitlements to assign to the at least a resource based on the assignment, the entity protocols, and at least a configurable parameter of the plurality of configurable parameters of the governance layer.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3B is an exemplary illustration of a graphical user interface displaying an operator dashboard comprising a tenants window view;

FIG. 4B is an exemplary illustration of a graphical user interface displaying an entity dashboard comprising a members tab;

FIG. 8 is a block diagram of an exemplary method for determining a quantity of dual-key entitlements to assign to at least a resource.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a quantity of dual-key entitlements to assign to at least a resource. The apparatus includes at least a computing device comprised of a processor and a memory communicatively connected to the processor. The memory instructs the processor to instantiate a configurable governance layer comprising a plurality of configurable parameters, wherein at least an entity of a plurality of entities access the configurable governance layer using an entity profile using an entity profile and configure the plurality of config-urable parameters. The processor receives an assignment from one or more entities, wherein the assignment com-prises at least validation data associated with the at least a resource and entity protocols associated with the entity. The processor is configured to determine a quantity of dual-key entitlements to assign to the at least a resource based on the assignment, the entity protocols, and at least a configurable parameter of the plurality of configurable parameters of the governance layer.

Figure 1:
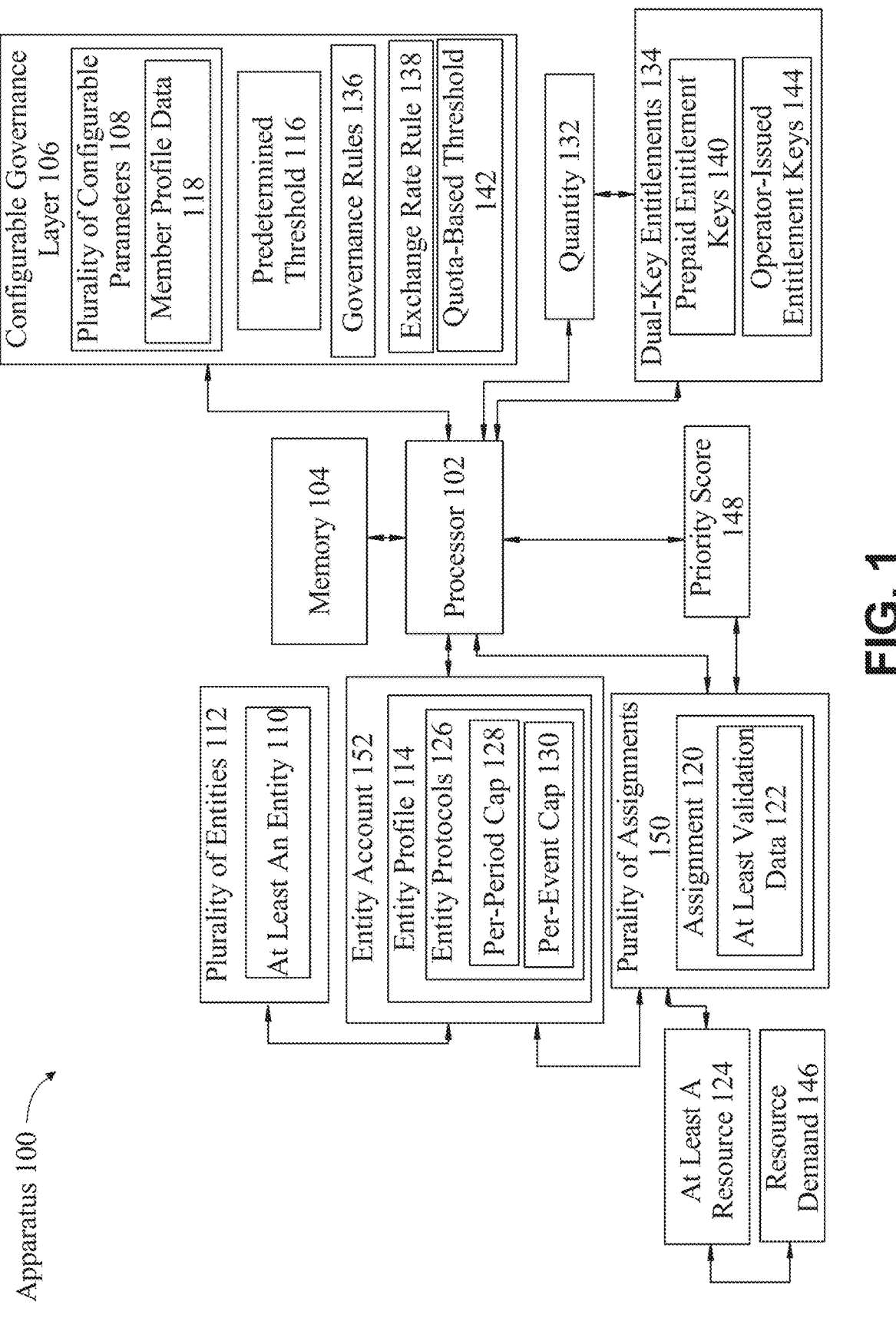
FIG. 1 is a block diagram of an apparatus for determining a quantity of dual-key entitlements to assign to at least a resource.

Referring now to FIG. 1, an exemplary embodiment of apparatus 100 for determining a quantity of dual-key entitle-ments to assign to at least a resource is illustrated. Apparatus 100 may include a processor 102 communicatively con-nected to a memory 104. As used in this disclosure, "com-municatively connected" means connected by way of a connection, attachment, or linkage between two or more relata which allows for reception and/or transmittance of information therebetween. For example, and without limi-tation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combina-tions thereof, and the like, among others. A communicative connection may be achieved, for example and without limitation, through wired or wireless electronic, digital or analog, communication, either directly or by way of one or more intervening devices or components. Further, commu-nicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Pri-mary memory" also known as "random access memory" (RAM) for the purposes of this disclosure is a short-term storage device in which information is processed. In one or more embodiments, during use of the computing device, instructions and/or information may be transmitted to pri-mary memory wherein information may be processed. In one or more embodiments, information may only be popu-lated within primary memory while a particular software is running. In one or more embodiments, information within primary memory is wiped and/or removed after the com-puting device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data struc-ture, such as a distributed hash table or the like. The database may include a plurality of data entries and/or records as described above. Data entries in database may be flagged with or linked to one or more additional elements of infor-mation, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and trans-mitted back to computing device. In one or more embodi-ments, server may be configured to perform one or more processes as described below to allow for increased com-putational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microproces-sor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating inde-pendently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, the entity protocol may include a plurality of operator entity protocols and a plurality of tenant entity protocols and determining the quantity of dual-key entitlements to assign to the at least a resource may include assigning a first quantity of a first key as a function of the plurality of operator entity protocols and assigning a second quantity of a second key as a function of the plurality of tenant entity protocols. As used in this disclosure, an "operator entity protocol" is a set of configurable rules, parameters, or conditions associated with an operator entity. The operator entity protocols may govern how entitlements are allocated, validated, or enforced within the governance layer of the apparatus. Without limitation, operator entity protocols may include per-event caps, per-period quotas, key prioritization order, expiration rules, or policy-driven adjustments defined by the operator. In an embodiment, operator entity protocols may be implemented within the governance layer through memory-resident policy tables, rule-execution engines, and time-based schedulers executed by processor 102. Without limitation, a per-event cap may be enforced using a counter module that increments a usage variable stored in memory 104 for each entitlement request, with the rule-execution engine comparing the requested quantity against the stored cap parameter before allowing the transaction. In another embodiment, a per-period quota may be governed through a time-based scheduler that periodically resets quota counters maintained in memory 104. Processor 102 may execute a rolling window algorithm to enforce the quota across configurable intervals such as daily, weekly, or monthly cycles. In an embodiment, key prioritization order may be enforced through a rules engine that applies operator-defined parameter arrays stored in memory 104. Without limitation, the apparatus 100 may consult the prioritization array during entitlement determination to consume one class of keys before another class of keys. In another embodiment, expiration rules may be implemented using timestamp metadata stored with each entitlement in memory 104. Processor 102 may execute a scheduled validation routine to compare entitlement timestamps against operator-defined expiration thresholds and automatically invalidate expired keys. In an embodiment, policy-driven adjustments may be supported through a governance policy engine capable of executing conditional logic rules. Without limitation, the apparatus 100 may apply operator-defined adjustment formulas such as reducing allocations during peak load or increasing allocations for specific resources, where the formulas are stored as executable policies in memory 104. For example, without limitation, these components may allow the operator entity protocols to provide real-time, automated enforcement of allocation and validation policies across all tenants, while ensuring consistent application of operator governance at scale.

With continued reference to FIG. 1, as used in this disclosure, a "tenant entity protocol" is a set of configurable rules, parameters, or conditions associated with a tenant entity. Without limitation, the tenant entity protocol may govern how entitlements requested or consumed by the tenant are processed by the apparatus. Without limitation, tenant entity protocols may include tenant-specific usage thresholds, validation limits, anomaly detection triggers, predefined allocation rules for tenant-initiated requests, and the like. In a non-limiting example, a tenant entity protocol may establish a daily usage threshold that limits a tenant to no more than fifty keys within a twenty-four-hour period, regardless of the number of validation requests submitted. In another non-limiting example, a tenant entity protocol may define a validation limit such that no individual validation request may exceed ten keys, with requests above that amount automatically adjusted downward by the apparatus 100. In an embodiment, a tenant entity protocol may incorporate an anomaly detection trigger, wherein a sudden surge in key requests, for instance, more than three times the historical daily average, may flag the tenant account for review and suspend additional requests until cleared. In another non-limiting example, a tenant entity protocol may specify a predefined allocation rule for tenant-initiated requests, such that bonus keys may always be consumed before prepaid keys, or that key consumption may be distributed evenly across multiple sub-resources associated with the tenant. For example, without limitation, the tenant entity protocol may allow the apparatus 100 to apply differentiated enforcement policies tailored to each tenant's historical usage pattern, business arrangement, or contractual obligations, while still operating under the broader governance layer controlled by operator entity protocols. In an embodiment, the apparatus 100 may implement tenant entity protocols using a combination of memory-resident data structures, rule-evaluation engines, and machine learning models executed by processor 102. Without limitation, tenant-specific usage thresholds may be stored as counters in memory 104, where each validation request increments or decrements the counters in real time. A rule-evaluation engine instantiated within the governance layer may compare the updated counters against tenant-defined thresholds and may enforce acceptance, denial, or adjustment actions accordingly. In another embodiment, anomaly detection triggers associated with tenant entity protocols may be implemented using supervised or unsupervised machine learning models. Without limitation, a supervised classifier trained on historical tenant validation logs may predict expected daily key consumption, while an unsupervised clustering model may identify irregular usage patterns without requiring labeled data. Processor 102 may execute the models against demand metrics tables stored in memory 104, and deviations beyond configurable confidence intervals may trigger suspension or throttling actions. In an embodiment, predefined allocation rules for tenant-initiated requests may be enforced through policy engines leveraging configurable parameter sets. Without limitation, the governance layer may store key prioritization rules as parameter arrays in memory 104, and the processor 102 may apply the arrays during entitlement determination to sequence key consumption such as consuming bonus keys before prepaid keys. For example, without limitation, these technologies may allow the apparatus 100 to tailor enforcement policies to each tenant's usage patterns, contractual arrangements, or business-specific rules, while still ensuring consistency with operator entity protocols instantiated at the governance layer.

With continued reference to FIG. 1, determining the quantity of dual-key entitlements to assign to the at least a resource may include assigning a first quantity of a first key as a function of the plurality of operator entity protocols and assigning a second quantity of a second key as a function of the plurality of tenant entity protocols. In an embodiment, the first key may correspond to prepaid entitlements governed primarily by operator-defined allocation rules, while the second key may correspond to promotional or bonus entitlements governed primarily by tenant-specific usage behaviors. In a non-limiting example, the apparatus 100 may determine that an operator entity protocol establishes a maximum of ten prepaid keys per event, while a tenant entity protocol may request a bonus key allocation based on historical activity. The processor 102 may evaluate both sets of protocols and assign entitlements in accordance with the governance layer, thereby ensuring that operator rules and tenant behaviors are reconciled in a consistent and automated manner.

Still referring to FIG. 1, processor 102 is configured to instantiate a configurable governance layer 106 comprising a plurality of configurable parameters 108, wherein at least an entity 110 of a plurality of entities 112 access the configurable governance layer 106 using an entity 110 profile and configure the plurality of configurable parameters. As used in this disclosure, a "configurable governance layer" is a computational construct instantiated by at least a processor 102 and operable to enforce, monitor, or apply governance rules 136. The configurable governance layer 106 may include a plurality of configurable parameters 108 that determine how entitlement keys are distributed, exchanged, or validated. Without limitation, the configurable governance layer 106 may provide an interface for entities 112 and/or operators to access and configure such parameters. In an embodiment, the apparatus 100 may be configured as a software system that operates as a configurable governance layer 106 which can be applied to any existing validation system, including but not limited to QR-based validation, license plate recognition validation, ticket barcode validation, or near-field communication validation. Without limitation, the apparatus 100 may function as a middleware or supervisory control engine that interfaces with heterogeneous validation platforms, receives validation requests, and applies governance rules 136 before approvals are issued. In a non-limiting example, the apparatus 100 may expose an application programming interface that allows existing validation systems to transmit validation requests, which are then evaluated by the processor 102 against governance parameters stored in memory 104, including thresholds, caps, and exchange rate rules 138. For example, without limitation, the apparatus 100 may be applied to a parking facility using license plate recognition, where the license plate scan generates a validation request that is routed to the apparatus 100, evaluated against key balances, and either approved or denied based on dual-key governance. In an embodiment, the apparatus 100 may control, allocate, and settle entitlements for services by introducing a dual-key mechanism that includes prepaid entitlement keys 140 and operator-issued entitlement keys 144. Without limitation, prepaid entitlement keys 140 may be purchased by tenants in advance and deducted from a prepaid balance when validations are granted, while operator-issued entitlement keys 144 may be allocated by operators under quota-based thresholds 142 that restrict the number of validations permitted per tenant. In a non-limiting example, the apparatus 100 may deduct prepaid entitlement keys 140 when tenants authorize validations during off-peak hours, while enforcing consumption of operator-issued entitlement keys 144 during peak hours up to the quota defined by the operator. For example, without limitation, this dual-key mechanism ensures operator oversight, tenant flexibility, and consistent validation benefits for members. In an embodiment, the apparatus 100 may settle entitlements in real time by updating key balances and recording transaction data in memory 104. Without limitation, the apparatus 100 may decrement operator-issued entitlement keys 144 or deduct prepaid entitlement keys 140 from an entity 110 account when a validation request is approved, while also writing settlement data into both a key ledger and an event log. In a non-limiting example, when a QR code is scanned at a parking gate, the apparatus 100 may calculate the key quantity required, deduct the keys accordingly, and transmit a confirmation signal to the gate controller. For example, without limitation, this real-time settlement may ensure transparency and auditability for operators, predictability for tenants, and seamless validation benefits for members. In an embodiment, the apparatus 100 may be extensible to support a wide variety of services, including but not limited to parking services, valet parking, and car wash services, or any service requiring controlled allocation of entitlements. Without limitation, the apparatus 100 may abstract the underlying validation technology, enabling the same dual-key governance framework to be applied across multiple modalities. In a non-limiting example, a car wash ticket barcode may be processed as validation data 122 for a resource 124, with the apparatus 100 applying the same dual-key entitlement rules that govern parking validations.

For example, without limitation, this extensibility may allow the apparatus 100 to integrate seamlessly with existing infrastructure while introducing governance, oversight, and settlement capabilities through its configurable governance layer 106.

With continued reference to FIG. 1, as used in this disclosure, "configurable parameters" are adjustable variables, conditions, or thresholds instantiated within the configurable governance layer 106 that define operational aspects of entitlement key management. Non-limiting examples of configurable parameters 108 may include key exchange rates, quota thresholds, per-period or per-event caps 130, member profile data 118, priority scoring rules, and the like. As used in this disclosure, an "entity" is a participant that accesses the configurable governance layer 106 to configure parameters. As used in this disclosure, an "entity" is, in some embodiments, interchangeably referred to as a "tenant," and the terms "entity" and "tenant" may be used herein to describe a business, organization, or participant. In an embodiment, the entity 110 may receive dual-key entitlements 134. In an embodiment, the entity 110 is a tenant, such as a business, organization, service provider, and the like, that purchases prepaid entitlement keys 140 or receives operator-issued entitlement keys 144 for application to members. As used in this disclosure, an "entity profile" is a data construct associated with an entity 110 that governs how the entity 110 interacts with the configurable governance layer 106. The entity profile 114 may include identifying information, entitlement key allocations, exchange-rate preferences, quota thresholds, rules defining how the entity 110 applies keys to members, and the like.

With continued reference to FIG. 1, as used in this disclosure, a "member" is an end user or customer associated with an entity 110 that ultimately receives a validation benefit through the application of entitlement keys. As used herein, a "member" may be used interchangeably with terms such as "customer," "end-user," or "user," wherein each of these terms may describe an individual who receives a validation benefit through the application of entitlement keys. As used in this disclosure, a "validation benefit" is an outcome applied to a member that results from the consumption of entitlement keys within a configurable governance layer 106. In an embodiment, the validation benefit may include a reduction in cost, a discount, an extension of service time, and/or an access privilege that is granted when keys are decremented or deducted from an entity record 152. Without limitation, the validation benefit may be applied to parking fees, retail services, transportation access, or other key-governed resources. In a non-limiting example, the validation benefit may include a discounted parking rate provided to a customer when a tenant applies operator-issued entitlement keys 144 or prepaid entitlement keys 140 in response to a member request. Without limitation, the member may not directly configure the configurable governance layer 106 but instead interacts with the system by redeeming or consuming validations issued by a tenant. In non-limiting examples, a member may be a parking customer who receives a discount when a tenant applies prepaid entitlement keys 140 or operator-issued entitlement keys 144 on the member's behalf. As used in this disclosure, an "operator" is a governing authority or controlling entity 110 that manages an entitlement governance framework, including the issuance, allocation, and monitoring of entitlement keys. In an embodiment, the operator may define governance rules 136 within a configurable governance layer 106, distribute operator-issued entitlement keys 144 to tenants, and enforce configurable parameters 108 such as exchange rates, thresholds, and key validity periods. In a non-limiting example, the operator may be a parking facility administrator or a system provider that allocates keys to tenants and configures system-wide validation protocols.

With continued reference to FIG. 1, in a non-limiting example, the apparatus 100 may include a validation management system. In an embodiment, the validation management system may enable operators to assign dual-key entitlements 134 that are free or quota-based start tokens to tenants, based on an agreed allowance that may be structured as a one-time allocation, a periodic distribution (like daily, monthly, or otherwise), or an automated issuance tied to tenant activity such as purchasing a specified number of prepaid points. In an embodiment, tenants may also purchase point tokens a type of dual-key entitlement 134 directly from the operator using the platform, and may apply these points to provide validation benefits such as discounted parking, valet services, car wash services, or other participating offerings to their customers or visitors, regardless of whether such customers are members of the platform. Without limitation, operators may configure governance rules to define usage conditions for these tokens, including but not limited to minimums and maximums per transaction, top-up amounts, available balances, and per-period quotas. In a non-limiting example, an operator may also negotiate exchange values of these tokens with the tenant, both at the time of purchase (money-to-token conversion) and at the time of redemption (token-to-money conversion), where such exchange rates may be variable and configurable to reflect factors such as discount type, discount amount, top-up conditions, and the like. For example, without limitation, the framework may allow a tenant such as an office administrator to validate a visitor's parking ticket by applying tokens allocated from the operator, while ensuring that the transaction remains governed and auditable under the configurable governance layer 106.

With continued reference to FIG. 1, in an embodiment, the interaction among operators, tenants, and members may be facilitated through a computing device comprising at least a processor 102, a memory 104, and a network interface. Without limitation, the operator may interact with the configurable governance layer 106 using an operator portal, such as a web-based or API-accessible control interface, wherein the operator defines governance rules 136 stored in memory 104 and executed by the processor 102. In a non-limiting example, the operator may upload configuration files or adjust parameters through a management dashboard, which are then written to a governance ruleset database that enforces key exchange rates, quota thresholds, and per-period validation caps at runtime. For example, without limitation, the operator portal may enable the operator to push updates to the governance layer in real time, such that revised thresholds for operator-issued entitlement keys 144 are immediately applied across all tenant accounts. In an embodiment, a tenant may access the governance layer using a tenant-facing application that is communicatively connected to the governance engine through an API layer. Without limitation, the tenant application may authenticate through an entity profile 114 stored in memory 104, where the profile includes key balances, entitlements, and tenant-specific rules. In a non-limiting example, when the tenant initiates a validation request for a member, the tenant application may call an API endpoint that queries the governance layer to determine whether prepaid keys, operator-issued keys, or a hybrid allocation should be decremented. For example, without limitation, the governance engine may respond to the request by executing instructions to decrement the tenant's operator-issued keys first, if available, before deducting prepaid keys, while simultaneously updating a distributed ledger that maintains key balances in near real time. In an embodiment, a member may engage the system through a client-facing interface, such as a mobile application, QR code scanner, NFC-enabled terminal, and the like. Without limitation, the member interaction may generate a validation request containing metadata, such as a ticket identifier, timestamp, geolocation, tenant identifier, and the like. In a non-limiting example, this validation request may be transmitted through a secure channel such as, TLS-encrypted HTTPS request, to the governance layer, where the processor 102 may evaluate the request against the entity protocols 126 stored in the entity profile 114. For example, without limitation, if the member presents a QR code at a parking gate, the system may process the validation by parsing the QR code data, matching it against the tenant's active entitlements, and triggering the deduction of keys in the tenant's account while simultaneously issuing a validation confirmation back to the gate controller. In an embodiment, the configurable governance layer 106 may incorporate dynamic adjustment logic implemented as executable modules stored in memory 104 and run by the processor 102. Without limitation, these modules may monitor system demand, member activity rates, and key consumption patterns to trigger real-time adjustments. In a non-limiting example, a demand-analysis microservice may increase the key exchange rate when system-wide utilization exceeds a defined threshold, and decrease the rate when underutilization is detected. For example, without limitation, this adjustment may occur through automated updates to smart contracts or database triggers, ensuring that operator oversight, tenant flexibility, and member validation benefits are all maintained through software-driven enforcement.

With continued reference to FIG. 1, the configurable governance layer 106 may include a predetermined threshold 116. As used in this disclosure, a "predetermined threshold" is a configurable parameter within the configurable governance layer 106 that defines a fixed or pre-established limit, condition, or value against which entitlement key activity is evaluated. In an embodiment, the predetermined threshold 116 may represent a quota, a maximum or minimum allocation, or a triggering condition that governs key distribution or consumption. Without limitation, the predetermined threshold 116 may be expressed as a numerical cap on operator-issued keys, a minimum balance of prepaid keys required for a validation, or a rate limit on the number of validations permitted during a given period. In a non-limiting example, the predetermined threshold 116 may comprise a rule that restricts a tenant to issuing no more than 20 operator-issued keys per day, or a condition that prevents a validation if a tenant account balance falls below a defined number of prepaid keys. In a non-limiting example, the configurable governance layer 106 may include a predetermined threshold 116 that restricts the number of operator-issued entitlement keys 144 a tenant can apply to validations within a twenty-four-hour period. In an embodiment, the predetermined threshold 116 may be set at 100 keys per day, such that once the tenant's account reaches this limit, the governance layer prevents further validations using operator-issued keys until the threshold resets. Without limitation, the predetermined threshold 116 may alternatively define a minimum prepaid key balance required before validations are permitted, such as requiring at least 10 prepaid keys to remain in the tenant's account to ensure continuity of service. For example, without limitation, if a tenant attempts to process a validation when the account balance has fallen below the threshold, the governance layer may deny the request or prompt the tenant to replenish prepaid keys before additional validation benefits can be granted to members. In an embodiment, the apparatus 100 may be configured to enforce a predetermined threshold 116 within a configurable governance layer 106. Without limitation, the apparatus 100 may comprise at least a processor 102 communicatively connected to a memory 104, wherein the memory 104 stores executable instructions and threshold rules for entitlement key governance. In a non-limiting example, the apparatus 100 may process an incoming validation request from a tenant by executing instructions that query a ruleset database containing the predetermined threshold 116 values, and the processor 102 may compare the request against the stored thresholds prior to authorizing the consumption of entitlement keys. For example, without limitation, the apparatus 100 may deny a validation request if a tenant has already consumed 100 operator-issued entitlement keys 144 in a twenty-four-hour period, thereby enforcing a daily quota threshold. In an embodiment, the apparatus 100 may implement the predetermined threshold 116 using event-driven architecture. Without limitation, validation requests generated by a tenant application may be transmitted to an application programming interface (API) layer that communicates with a threshold-checking microservice instantiated within the apparatus 100. In a non-limiting example, the threshold-checking microservice may leverage a message queue or event bus to receive validation events, evaluate them against the predetermined threshold 116 stored in memory 104, and return an allow or deny decision. For example, without limitation, the apparatus 100 may employ a policy engine executing on the processor 102 to enforce rules that prevent validations when key balances or usage rates fall below or exceed the configured limits. In an embodiment, the apparatus 100 may further enable dynamic updates of predetermined thresholds through an operator-facing management portal. Without limitation, the operator may adjust threshold values that are stored in a configuration service within the apparatus 100, such that the updated thresholds propagate across the governance layer in real time. In a non-limiting example, the operator may increase a tenant's daily threshold from 100 to 200 operator-issued keys, and the apparatus 100 may immediately enforce the new threshold without requiring downtime or system reset. For example, without limitation, the apparatus 100 ensures continuous enforcement of operator policies while allowing tenants to apply validations for members within updated operational limits.

With continued reference to FIG. 1, the plurality of configurable parameters 108 may include member profile data 118. As used in this disclosure, "member profile data" is information associated with a member that is stored, managed, and utilized within a configurable governance layer 106 to govern how entitlement keys are consumed in connection with validations. In an embodiment, the member profile data 118 may include identifiers, attributes, preferences, and usage histories that are used by an apparatus 100 to determine eligibility, key exchange rates, or priority in connection with validation benefits. Without limitation, the member profile data 118 may comprise unique identifiers such as a QR code, mobile application account, RFID tag, or license plate number; demographic or contextual data such as membership tier, loyalty status, or visit frequency; and transaction history such as prior validations or key consumption rates. In a non-limiting example, the member profile data 118 may allow the apparatus 100 to provide differentiated validation benefits, such as enhanced discounts for frequent members or dynamic exchange rates based on cumulative key usage. In an embodiment, the apparatus 100 may include a memory 104 storing a member database, wherein each record corresponds to a member profile. Without limitation, the apparatus 100 may instantiate a data schema that associates a member identifier with entitlement key balances, transaction history, and configurable rules for validation. In a non-limiting example, the member database may be implemented as a relational database such as Post-greSQL or MySQL with normalized tables linking members, keys, and validation events, or as a NoSQL database such as MongoDB or DynamoDB to support scalable document-oriented storage of profile attributes. For example, without limitation, the apparatus 100 may store a member's loyalty tier as a field within the profile record, and the governance layer may query that field at runtime to determine whether to apply a higher validation discount. In an embodiment, the apparatus 100 may further employ an API layer to enable retrieval and update of member profile data 118 during validation workflows. Without limitation, when a member presents a QR code at a parking gate, the tenant application may call an API endpoint to retrieve the corresponding member profile data 118, which the processor 102 may then evaluate against governance rules 136 stored in memory 104. In a non-limiting example, the processor 102 may execute instructions to determine that the member is a gold tier customer and therefore entitled to a fifty percent parking discount, which triggers a deduction of prepaid entitlement keys 140 at a preferential exchange rate. For example, without limitation, the apparatus 100 may update the member profile data 118 in real time by writing the new transaction record into the database and decrementing the key balance accordingly. In an embodiment, the apparatus 100 may incorporate analytics modules that continuously monitor member profile data 118 for trends and dynamic adjustments. Without limitation, the apparatus 100 may use machine learning models or rule-based engines to detect frequent users and automatically assign additional operator-issued keys to the tenant associated with such members. In a non-limiting example, the apparatus 100 may calculate that a member has exceeded a threshold of ten visits per week and trigger an automatic parameter adjustment that reduces key exchange rates for that member's future validations. For example, without limitation, this adjustment may be implemented by updating a smart contract in a distributed ledger system, which enforces validation benefits transparently and prevents tampering.

With continued reference to FIG. 1, in an embodiment, the apparatus 100 may employ a smart contract in a distributed ledger system to manage member profile data 118 and enforce key-based validation rules. As used in this disclosure, a "smart contract" is a deterministic software program stored on a blockchain or distributed ledger that automatically executes predefined conditions when triggered by a transaction or event. Without limitation, the smart contract may encapsulate governance rules 136 relating to entitlement keys, such as exchange rates, quota thresholds, or validation eligibility requirements, and may execute these rules transparently and immutably whenever a validation request is submitted. In an embodiment, the smart contract may be deployed on a distributed ledger framework such as Ethereum, Hyperledger Fabric, or Quorum. Without limitation, the smart contract code may define functions for reading and writing key balances, checking against predetermined thresholds, and recording validation transactions. In a non-limiting example, when a member requests a parking validation, the tenant application may transmit a transaction to the distributed ledger system, which invokes the smart contract to evaluate whether sufficient prepaid or operator-issued keys are available and whether the member profile data 118 satisfies eligibility rules. For example, without limitation, if the member's profile data indicates a gold tier status and the tenant's prepaid key balance is above the required threshold, the smart contract may automatically approve the validation, deduct the required number of keys, and record the event immutably on the ledger. In an embodiment, the use of a smart contract may ensure auditability and tamper resistance. Without limitation, each validation event may be written as a transaction on the distributed ledger, creating a permanent record of the member, tenant, operator, and key consumption details. In a non-limiting example, the smart contract may store the member identifier, timestamp, entitlement key type, and validation amount, which may allow operators to monitor compliance and tenants to reconcile their accounts without relying on centralized databases. For example, without limitation, this distributed ledger implementation may provide transparency to all parties while reducing the risk of fraud or misallocation of entitlement keys. In an embodiment, the apparatus 100 may further integrate oracles to extend smart contract functionality beyond the ledger. As used in this disclosure, an "oracle" is a trusted service, component, or module that supplies external data to a smart contract in a distributed ledger system or to an apparatus 100 implementing governance rules 136, thereby enabling the smart contract or apparatus 100 to respond to conditions outside the distributed ledger. Without limitation, an oracle may act as a trusted service that supplies external data, such as real-time parking occupancy, time-of-day, or dynamic pricing information, to the smart contract. In a non-limiting example, the oracle may update the smart contract with current demand data, which adjusts the key exchange rate in the governance layer automatically. For example, without limitation, the smart contract may increase the number of prepaid keys required for a validation during peak hours and decrease the requirement during off-peak hours, ensuring that key consumption reflects real-world conditions. In an embodiment, the smart contract may interact with the member profile database through hashed identifiers to preserve privacy. Without limitation, the smart contract may reference only anonymized hashes of member identifiers rather than storing sensitive personal information directly on the ledger. In a non-limiting example, when a validation is processed, the apparatus 100 may compute a hash of the member's identifier and transmit it to the distributed ledger for recording. For example, without limitation, this enables validation benefits to be applied securely and transparently while ensuring that sensitive member profile data 118 remains in secure off-chain storage controlled by the apparatus 100. In an embodiment, security and privacy of member profile data 118 may be maintained through encryption and authentication protocols. Without limitation, the apparatus 100 may encrypt member profile data 118 at rest using AES-256 and in transit using TLS, while also enforcing access control policies that restrict tenants from viewing sensitive identifiers. In a non-limiting example, the apparatus 100 may issue authentication keys using OAuth 2.0 to ensure that only authorized applications can query or update member profile data 118. For example, without limitation, this prevents unauthorized tenants from modifying another tenant's member profiles while ensuring that validation benefits are applied only in accordance with governance rules 136.

Still referring to FIG. 1, processor 102 is configured to receive an assignment 120 from one or more entities 112, wherein the assignment 120 comprises at least validation data 122 associated with the at least a resource 124 and entity protocols 126 associated with the entity 110. As used in this disclosure, an "assignment" is a data construct received and processed by an apparatus 100 that encapsulates instructions, requests, or entitlements communicated from one or more entities 112 to the configurable governance layer 106. In an embodiment, the assignment 120 may include validation data 122, resource 124 identifiers, entity protocols 126, and key consumption parameters, which the apparatus 100 uses to determine how entitlement keys are to be applied. Without limitation, the assignment 120 may be transmitted as a structured message such as a JSON payload, XML object, or blockchain transaction. In a non-limiting example, an assignment 120 may include a tenant identifier, a member request for validation, a resource 124 such as a parking ticket identifier, and the applicable entity rules, all of which are processed by the apparatus 100 to generate a key deduction. As used in this disclosure, "validation data" is information contained within an assignment 120 that describes the request or parameters necessary to apply a validation benefit to a member. In an embodiment, validation data 122 may comprise member identifiers, resource 124 identifiers, timestamps, requested discount amounts, or validation conditions. Without limitation, validation data 122 may be structured as machine-readable input used by the apparatus 100 to authenticate a request and determine key eligibility. In a non-limiting example, validation data 122 may include a QR code string scanned at a parking gate, the corresponding parking session ID, and the requested discount, which the apparatus 100 evaluates against tenant protocols before applying entitlement keys.

With continued reference to FIG. 1, as used in this disclosure, a "resource" is a service, asset, or consumable unit to which entitlement keys are applied in connection with a validation. In an embodiment, the resource 124 may be a parking session, a physical access privilege, a digital service, or any unit governed by key-based rules in the governance layer. Without limitation, resources may be represented as digital objects in a database, with attributes such as resource 124 ID, availability, cost, and entitlement eligibility. In a non-limiting example, the resource 124 may be a parking garage session identified by a ticket number, where the apparatus 100 applies keys to reduce the member's parking fee. For example, without limitation, the resource 124 may be a car wash service, where the system deducts keys to offset the cost of the wash. In an embodiment, the apparatus 100 may be configured to receive an assignment 120 from one or more entities 112, wherein the assignment 120 comprises validation data 122 associated with at least a resource 124 and entity protocols 126 associated with the entity 110. Without limitation, the assignment 120 may be transmitted from a tenant application to the apparatus 100 through an API endpoint, where the payload includes validation data 122 such as a member identifier, a timestamp, and a resource 124 identifier such as a parking ticket number. In a non-limiting example, the apparatus 100 may parse the assignment 120 and execute instructions to cross-reference the validation data 122 with the entity protocols 126 stored in the entity profile 114. For example, without limitation, if the tenant's entity protocol 126 specifies that validations during peak hours require ten prepaid keys, the apparatus 100 may evaluate the incoming assignment 120 against that rule and deduct the appropriate keys from the tenant's account. In an embodiment, the assignment 120 may include operator-defined governance parameters that act as overrides or additional checks. Without limitation, the apparatus 100 may determine whether the assignment 120 exceeds predetermined thresholds, whether the requested validation is eligible for operator-issued keys, and whether the resource 124 is active or valid in the system database. In a non-limiting example, if the assignment 120 requests validation for a ticket that has already expired, the apparatus 100 may reject the assignment 120 and generate a denial message. For example, without limitation, if the assignment 120 is valid, the apparatus 100 may decrement the keys, update the resource 124 record in memory 104, and transmit a validation confirmation to the member-facing interface.

With continued reference to FIG. 1, the at least a processor 102 is further configured to enforce a per-period cap 128 associated with the entity protocols 126. As used in this disclosure, a "per-period cap" is a configurable parameter within the governance layer that defines a maximum number of entitlement keys or validations that an entity 110 may consume, distribute, or apply during a specified time interval. In an embodiment, the per-period cap 128 may be expressed as a daily, weekly, monthly, or custom-defined time window during which the apparatus 100 enforces key usage limits. Without limitation, the per-period cap 128 may apply to operator-issued keys, prepaid keys, or a combination thereof, and may be associated with the entity protocols 126 stored in an entity profile 114. In a non-limiting example, the per-period cap 128 may restrict a tenant to issuing no more than 100 operator-issued keys per week, thereby ensuring that the tenant cannot exceed its allocated quota within that period. For example, without limitation, the apparatus 100 may implement the per-period cap 128 by maintaining a time-stamped ledger of key consumption events in memory 104, continuously comparing the cumulative usage against the cap, and automatically denying validation requests once the cap has been reached until the start of the next defined period. In an embodiment, the apparatus 100 may be configured to enforce a per-period cap 128 using a combination of time-based counters, event logs, and validation rules stored in memory 104 and executed by the processor 102. Without limitation, the apparatus 100 may maintain a time-stamped transaction ledger in a database, where each entitlement key consumption event is recorded with the entity identifier, resource 124 identifier, key type, and timestamp. In a non-limiting example, when a new validation request is received, the apparatus 100 may execute instructions to query the ledger for all consumption events within the current time interval and calculate the total key usage. For example, without limitation, if the per-period cap 128 for a tenant is 100 operator-issued keys per week and the query returns 100 or more usage events, the apparatus 100 may deny the request and return an error or advisory message through the tenant-facing application. In an embodiment, the apparatus 100 may implement sliding window counters to enforce per-period caps 128 more efficiently. Without limitation, the processor 102 may maintain a counter that increments with each key consumption event and decrements as events age out of the defined time window. In a non-limiting example, a sliding seven-day window may be applied, such that the counter reflects the sum of operator-issued keys used during the most recent seven days. For example, without limitation, this approach allows the apparatus 100 to enforce flexible per-period caps 128 without recalculating totals across the entire ledger each time. In an embodiment, the apparatus 100 may employ scheduled tasks or database triggers to reset or update per-period caps 128 automatically. Without limitation, the apparatus 100 may use a cron-like scheduling service or a distributed task manager to reset counters at fixed intervals such as midnight for daily caps or the first day of the month for monthly caps. As used in this disclosure, a "cron-like scheduling service" is a system or tool that automatically executes tasks or jobs at specified times or intervals, based on a schedule defined by the user. As used in this disclosure, a "distributed task manager" is a system or software framework that coordinates, schedules, and executes tasks across multiple computing nodes or machines within a distributed environment. A distributed task manager is designed to divide workloads into smaller tasks, allocate those tasks to available resources, monitor their execution, and handle failures or retries as needed. Such a system ensures efficient use of computational resources, scalability to handle large or complex jobs, and reliability by balancing work across the distributed infrastructure. In a non-limiting example, when the reset event occurs, the apparatus 100 may archive the previous period's usage data to a historical table and initialize counters for the new period. For example, without limitation, this ensures that the governance layer applies fresh enforcement rules at the start of each defined period without requiring manual intervention. In an embodiment, the apparatus 100 may integrate with distributed ledger technology to record and enforce per-period caps 128 transparently. Without limitation, a smart contract in a distributed ledger system may store the cap values and verify that a key consumption transaction does not exceed the allowed limit before committing it to the ledger. In a non-limiting example, if a tenant attempts to consume additional keys beyond the monthly cap of 500 prepaid keys, the smart contract may automatically reject the transaction and return a denial event to the apparatus 100. For example, without limitation, this distributed enforcement mechanism may ensure immutability and auditability of per-period cap 128 compliance.

With continued reference to FIG. 1, the at least a processor 102 is further configured to enforce a per-event cap 130 associated with the entity protocols 126. As used in this disclosure, a "per-event cap" is a configurable parameter within the governance layer that defines a maximum number of entitlement keys or validations that may be applied to a single validation event, transaction, or resource 124 request. In an embodiment, the per-event cap 130 may operate independently of a per-period cap 128 by restricting key usage at the level of an individual event rather than across a defined time window. Without limitation, the per-event cap 130 may ensure that no single validation request consumes more than a predetermined amount of keys, regardless of the overall key balance or per-period allowance of the entity 110. In a non-limiting example, the per-event cap 130 may restrict a tenant from applying more than ten prepaid keys to a single parking session, thereby preventing excessive key consumption on one transaction. For example, without limitation, the apparatus 100 may implement the per-event cap 130 by receiving a validation request, parsing the associated validation data 122, and executing instructions to compare the requested key allocation against the per-event cap 130 stored in memory 104. If the requested allocation exceeds the cap, the apparatus 100 may automatically adjust the key usage to the maximum permitted amount or deny the request outright, thereby enforcing the entity protocols 126 in real time. In an embodiment, the apparatus 100 may be configured to enforce a per-event cap 130 through input validation logic executed by at least a processor 102 when processing a validation request. Without limitation, when a tenant application submits an assignment 120 containing validation data 122, the apparatus 100 may parse the request payload and extract the number of entitlement keys requested for application to a resource 124. The processor 102 may then compare this requested value against the per-event cap 130 stored in memory 104 as part of the entity profile 114. In a non-limiting example, if a tenant requests to apply twenty prepaid keys to a single parking session but the per-event cap 130 for that tenant is ten keys, the apparatus 100 may automatically adjust the request to deduct only ten keys or reject the request entirely. For example, without limitation, the apparatus 100 may generate a denial message communicated back to the tenant application, which in turn informs the member interface that the requested validation could not be fulfilled in full. In an embodiment, the apparatus 100 may implement per-event cap 130 enforcement at the API layer through request filtering. Without limitation, the API endpoint receiving a validation request may include middleware instructions that inspect the key quantity field in the request payload and enforce upper bounds before the request is processed further. In a non-limiting example, if the payload specifies a validation requiring fifty operator-issued keys but the per-event cap 130 is set to five, the middleware may immediately return an error code and prevent the request from reaching the governance layer. For example, without limitation, this ensures that per-event caps 130 are enforced consistently across distributed systems and prevents excessive load on downstream services. In an embodiment, the apparatus 100 may further enforce per-event caps 130 through database-level constraints. Without limitation, the apparatus 100 may maintain a key ledger table where each validation event is written as a transaction, and the database schema may include triggers that reject write operations exceeding the per-event cap 130. In a non-limiting example, when an insert operation attempts to record a deduction of twenty prepaid keys for a single validation event, but the schema defines a maximum of ten, the database engine may block the transaction and return an error to the governance layer. For example, without limitation, this database-driven enforcement adds another layer of protection against violations of entity protocols 126. In an embodiment, per-event caps 130 may be encoded in a smart contract in a distributed ledger system. Without limitation, the smart contract may define a function that evaluates the number of keys attached to a validation transaction and reverts the transaction if the number exceeds the per-event cap 130 parameter. In a non-limiting example, if a tenant attempts to commit a validation that deducts twenty prepaid keys for a single parking ticket, the smart contract may automatically reject the transaction, preventing it from being written to the blockchain. For example, without limitation, this ensures tamper-resistant, auditable enforcement of per-event caps 130 in environments where distributed trust is required. In an embodiment, the apparatus 100 may employ input sanitization and exception handling to ensure robustness of per-event cap 130 enforcement. Without limitation, malformed or malicious requests that attempt to bypass the per-event cap 130 may be detected through boundary checks, logging mechanisms, and anomaly detection routines running in the processor 102. In a non-limiting example, if a tenant application sends a validation request with a negative key value or an excessively large integer intended to exploit overflow vulnerabilities, the apparatus 100 may sanitize the input, reject the request, and flag the entity profile 114 for audit. For example, without limitation, this may provide resilience against attacks or misconfigurations that could undermine the enforcement of per-event caps 130.

Still referring to FIG. 1, processor 102 is configured to determine a quantity 132 of dual-key entitlements 134 to assign to the at least a resource 124 based on the assignment 120, the entity protocols 126, and at least a configurable parameter of the plurality of configurable parameters 108 of the governance layer 106. As used in this disclosure, a "quantity" is a measurable value that specifies the number or amount of entitlement keys to be assigned, decremented, or deducted in connection with a validation event. Without limitation, the quantity 132 may be determined by the apparatus 100. Without limitation, the quantity 132 may be determined by governance rules 136 stored in memory 104, predetermined thresholds defined by the operator, exchange-rate protocols associated with prepaid entitlement keys 140, quota limits associated with operator-issued entitlement keys 144, member profile data 118 influencing validation eligibility, or dynamic adjustment logic that accounts for real-time demand conditions. In a non-limiting example, the apparatus 100 may calculate the quantity 132 by multiplying the duration of a requested parking session by a time-based exchange rate, then applying any applicable discounts based on the member's loyalty tier, and finally enforcing the per-event and per-period caps 128 associated with the tenant's entity profile 114. For example, without limitation, if a member requests a three-hour parking validation during peak hours, the apparatus 100 may determine a quantity 132 of six prepaid keys to be deducted, while ensuring that the total keys consumed remain within both the per-event and per-period caps 128 defined for that tenant. In an embodiment, the quantity 132 may be represented as an integer, counter, or numerical value stored in memory 104 and processed by the governance layer. Without limitation, the quantity 132 may reflect the total number of keys required to satisfy a validation request, the maximum number of keys permitted under entity protocols 126, or the difference between a requested allocation and an enforced cap. In a non-limiting example, the quantity 132 may be calculated as five prepaid keys deducted from a tenant account to validate a two-hour parking session. For example, without limitation, the apparatus 100 may compute the quantity 132 dynamically based on key exchange rates, predetermined thresholds, or member profile data 118.

With continued reference to FIG. 1, as used in this disclosure, a "key" is a digital construct used to authenticate, identify, or enable access to a system resource, transaction, or entitlement. A key may include, but is not limited to, a voucher and/or a token and may be referred to as such herein. As used in this disclosure, "dual-key entitlements" are two distinct categories of entitlement keys governed within the configurable governance layer 106. In an embodiment, the dual-key entitlement 134 may include operator-issued entitlement keys 144. In an embodiment, the dual-key entitlement 134 may include prepaid entitlement keys 140. In an embodiment, the dual-key entitlements 134 may be managed in parallel by the apparatus 100, such that validations may consume either key type independently or a combination of both, depending on the entity protocols 126. Without limitation, operator-issued entitlement keys 144 may be distributed to tenants under quota-based rules defined by the operator, while prepaid entitlement keys 140 may be purchased by tenants in advance and stored in entity records 152 for subsequent use. In a non-limiting example, a tenant may receive fifty operator-issued keys each month and may additionally purchase two hundred prepaid keys, and the apparatus 100 may apply a quantity 132 of keys from either category when processing a member's validation request. For example, without limitation, the governance layer may prioritize consumption of operator-issued keys until exhausted, after which prepaid keys are deducted, thereby enforcing a dual-key entitlement scheme.

With continued reference to FIG. 1, the at least a processor 102 may be further configured to instantiate the configurable governance layer 106 by loading, from the memory 104, governance rules 136 defining entitlement key distribution, establishing, using the governance layer, at least a conversion rule 138 for prepaid entitlement keys 140, and enforcing, using the governance layer, a quota-based threshold 142 for operator-issued entitlement keys 144. As used in this disclosure, "governance rules" are programmable instructions or policy definitions stored in memory 104 and executed by the apparatus 100 to regulate the distribution, allocation, and consumption of entitlement keys within the configurable governance layer 106. In an embodiment, governance rules 136 may define conditions such as how keys are assigned to resources, how caps are enforced, and how dual-key entitlements 134 are prioritized. Without limitation, governance rules 136 may be expressed as database records, executable code modules, policy engine directives, smart contract logic in a distributed ledger system, and the like. In a non-limiting example, governance rules 136 may define that operator-issued entitlement keys 144 must be consumed prior to prepaid entitlement keys 140 and that no more than one hundred keys may be applied per week. For example, without limitation, governance rules 136 may be dynamically updated by an operator through a management portal, enabling real-time modification of entitlement key distribution.

With continued reference to FIG. 1, as used in this disclosure, an "exchange rate rule" is a governance parameter that defines the rate at which prepaid entitlement keys 140 are converted into validation benefits for a member. In an embodiment, the exchange rate rule 138 may be expressed as a numerical ratio, multiplier, or function that determines the number of keys required per unit of resource 124 consumption. Without limitation, exchange rate rules 138 may vary based on factors such as time-of-day, member profile data 118, demand conditions, or contractual agreements between an operator and a tenant. In a non-limiting example, a conversion rule 138 may define that one prepaid entitlement key equals thirty minutes of parking during off-peak hours but equals fifteen minutes of parking during peak hours. For example, without limitation, the apparatus 100 may calculate key deductions by applying the exchange rate rule 138 in real time when processing validation requests.

With continued reference to FIG. 1, as used in this disclosure, "prepaid entitlement keys" are a category of dual-key entitlements 134 that are purchased in advance by a tenant and stored in an entity record 152 for later use in connection with member validations. In an embodiment, prepaid entitlement keys 140 may be consumed when a tenant authorizes a validation, with deductions applied directly to the tenant's prepaid balance. Without limitation, prepaid entitlement keys 140 may be associated with configurable exchange rate rules 138 and may enable tenants to offer validation benefits at their own expense. In a non-limiting example, a tenant may purchase one thousand prepaid entitlement keys 140 at a negotiated rate and use them to provide discounted parking to members over the course of a month. For example, without limitation, the apparatus 100 may deduct prepaid entitlement keys 140 in real time upon receiving a validation request and update the tenant's balance in memory 104.

With continued reference to FIG. 1, as used in this disclosure, a "quota-based threshold" is a governance limit defined within the configurable governance layer 106 that specifies the maximum number of operator-issued entitlement keys 144 an entity 110 may consume within a defined time period or allocation cycle. In an embodiment, the quota-based threshold 142 may prevent tenants from exceeding the operator-controlled allotment of keys and may reset periodically based on governance rules 136. Without limitation, quota-based thresholds 142 may be enforced by counters, timers, or distributed ledger smart contracts. In a non-limiting example, a tenant may be restricted to consuming no more than fifty operator-issued entitlement keys 144 per day, and any additional validation requests that exceed this quota-based threshold 142 may be denied or deferred by the apparatus 100. For example, without limitation, the quota-based threshold 142 ensures that operator-issued keys are distributed fairly and consistently across multiple tenants.

With continued reference to FIG. 1, as used in this disclosure, "operator-issued entitlement keys" are a category of dual-key entitlements 134 allocated to tenants directly by an operator. In an embodiment, the operator-issued entitlement keys 144 may be allocated under a quota-based or a rule-based governance. In an embodiment, operator-issued entitlement keys 144 may be distributed periodically or on demand and may be non-transferable, non-tradeable, and non-withdrawable. Without limitation, operator-issued entitlement keys 144 may provide operators with direct oversight of tenant validation activity and may be used to limit or control the validation benefits that tenants can apply. In a non-limiting example, an operator may allocate fifty operator-issued entitlement keys 144 per month to a tenant, which can be spent on validations until the monthly quota is exhausted. For example, without limitation, the apparatus 100 may decrement operator-issued entitlement keys 144 in real time when a validation request is approved, ensuring compliance with operator protocols.

With continued reference to FIG. 1, in an embodiment, the apparatus 100 may be further configured to instantiate the configurable governance layer 106 by executing instructions stored in memory 104 that load governance rules 136 defining entitlement key distribution. Without limitation, the memory 104 may store a ruleset database or configuration file containing predefined instructions that specify how dual-key entitlements 134 are assigned, prioritized, or limited in connection with validation events. In a non-limiting example, the governance rules 136 may include directives that require operator-issued entitlement keys 144 to be consumed before prepaid entitlement keys 140, that restrict the number of keys a tenant can use during a given period, and that define different exchange rates for distinct classes of members. For example, without limitation, the apparatus 100 may parse and load these governance rules 136 into an in-memory rules engine at system startup, enabling the processor 102 to evaluate validation requests in real time against the loaded policies. In an embodiment, the apparatus 100 may establish, using the configurable governance layer 106, at least a conversion rule 138 for prepaid entitlement keys 140. Without limitation, the processor 102 may calculate key consumption values by applying mathematical formulas, multipliers, or functions stored as part of the governance rules 136. In a non-limiting example, the exchange rate rule 138 may define that one prepaid entitlement key equals one hour of parking during normal demand periods, while two keys are required per hour during peak demand periods. For example, without limitation, the apparatus 100 may dynamically retrieve exchange rate rules 138 based on contextual data such as time-of-day or member tier and then apply the corresponding exchange-rate calculation to determine the quantity 132 of prepaid entitlement keys 140 to be deducted. In an embodiment, the apparatus 100 may enforce, using the configurable governance layer 106, a quota-based threshold 142 for operator-issued entitlement keys 144. Without limitation, the processor 102 may maintain counters or ledgers that track the cumulative consumption of operator-issued keys by a tenant within a given period, and may compare each new validation request against the quota-based threshold 142 stored in memory 104. In a non-limiting example, if the quota-based threshold 142 is set to fifty operator-issued keys per week, the processor 102 may decrement the counter with each approved validation and reject or suspend further validation requests once the counter reaches fifty until the threshold resets. For example, without limitation, the apparatus 100 may provide an automated denial message or advisory notification to the tenant application when a validation request is blocked due to the quota-based threshold 142 being exceeded, thereby ensuring operator control over key distribution. In an embodiment, loading governance rules 136, applying exchange rate rules 138 for prepaid entitlement keys 140, and enforcing quota-based thresholds 142 for operator-issued entitlement keys 144 may operate together to implement a dual-key entitlement governance framework. Without limitation, the governance layer instantiated by the apparatus 100 may ensure that validation events are processed consistently, transparently, and in compliance with both operator policies and tenant configurations. In a non-limiting example, when a member requests validation through a tenant application, the apparatus 100 may first apply governance rules 136 to determine which category of keys should be consumed, may then calculate the key deduction based on the applicable exchange rate rule 138 for prepaid entitlement keys 140, and may finally verify that the quota-based threshold 142 for operator-issued entitlement keys 144 has not been exceeded before approving the validation. For example, without limitation, this layered governance ensures that operator oversight, tenant flexibility, and member validation benefits are all achieved simultaneously through the configurable governance layer 106.

With continued reference to FIG. 1, in a non-limiting example, the configurable governance layer 106 may further include a baseline value equivalence for all tokens, or dual-key entitlements 134. In a non-limiting example, the configurable governance layer 106 may operate as a unified control system that ensures operator rules, tenant flexibility, and customer benefits are applied together in a consistent manner. The configurable governance layer 106 may further include a baseline value equivalence for all tokens, such as Stars and Points, so that different types of discounts or entitlements can be expressed in a common and consistent token format. As used in this disclosure, a "baseline value equivalence" is a configurable reference that defines the value of a token and enables discounts or entitlements of different types to be expressed in equivalent token quantities. The baseline value equivalence may provide a universal mechanism for allocating, settling, and controlling validations and discount entitlements across different services, tenants, and projects. In an embodiment, each token may correspond to a predefined value anchor, such that any type of discount, whether expressed as a percentage, a fixed amount, or a time-based benefit, may be seamlessly converted into an equivalent token quantity. Without limitation, a percentage discount applied to valet parking, a time-based discount applied to parking, or a fixed-amount discount applied to a car wash may all be reconciled into token deductions under this value-based approach. In a non-limiting example, the operator may configure distinct equivalence rates for different tenants, projects, or services, thereby enabling differentiated incentives and flexible settlement models. For example, without limitation, Tenant A may operate with a rule that one Star corresponds to a first baseline value, while Tenant B may operate with a rule that one Star corresponds to a second baseline value, allowing the same discount to translate into different token costs for different tenants. In an embodiment, anchoring tokens to a baseline value may provide universal translation across discount formats, ensure cross-service compatibility, simplify operational logic, and enhance scalability of the settlement layer. In a non-limiting example, alternative approaches that rely exclusively on service units or percentages may introduce limitations that reduce flexibility and interoperability across different services. For instance, a unit-based system may define a token only in terms of a specific service, such as equating one token to fifteen minutes of parking, which may not translate effectively when applied to other services like valet, shuttle, or car wash. A percentage-based system may require the validation platform to continuously access and process service pricing information to determine the discount value, thereby increasing complexity and reducing scalability. In contrast, a baseline value equivalence may allow diverse forms of entitlements or discounts to be reconciled into a common token or key format, enabling consistent application across multiple tenants, projects, and services.

With continued reference to FIG. 1, the at least a processor 102 may be further configured to adjust the assignment 120 of dual-key entitlements 134 dynamically as a function of a resource demand 146. As used in this disclosure, "resource demand" is a measurable condition or parameter that reflects the level of utilization, availability, or consumption pressure associated with a resource 124 to which dual-key entitlements 134 are applied. In an embodiment, resource demand 146 may be quantified by metrics such as occupancy rate, transaction volume, time-of-day load, or real-time service utilization, and may be monitored continuously by the apparatus 100. Without limitation, the apparatus 100 may obtain resource demand 146 data from internal system counters, connected sensors, or external data feeds integrated through an oracle. In a non-limiting example, resource demand 146 may correspond to the number of active parking sessions in a facility, the percentage of available spaces in use, or the frequency of validation requests over a defined interval. For example, without limitation, when resource demand 146 exceeds a predetermined threshold 116, the apparatus 100 may dynamically increase the quantity 132 of prepaid entitlement keys 140 required to apply a validation, whereas when demand is low, the apparatus 100 may reduce the required keys, thereby adjusting the assignment 120 of dual-key entitlements 134 in real time. In an embodiment, the processor 102 of the apparatus 100 may be configured to receive resource demand 146 information through one or more data acquisition channels integrated into the configurable governance layer 106. Without limitation, resource demand 146 information may be collected from hardware sensors, transactional logs, tenant applications, member interfaces, or third-party systems connected through secure data feeds. In a non-limiting example, parking occupancy sensors embedded in a facility may transmit real-time space availability data through an IoT gateway, while tenant applications may generate transaction counts that reflect the number of active validation requests over a defined interval. For example, without limitation, the apparatus 100 may receive this data as structured payloads in the form of JSON messages transmitted through a message broker or REST API. In an embodiment, once the processor 102 receives the resource demand 146 information, the apparatus 100 may process the incoming data using parsing, normalization, and validation routines. Without limitation, the processor 102 may execute instructions to filter out erroneous or duplicate records, convert raw sensor data into standardized units, and validate timestamps for chronological accuracy. In a non-limiting example, occupancy data may be normalized into a percentage value indicating the proportion of parking spaces currently in use. For example, without limitation, the apparatus 100 may store the processed data in a demand metrics table in memory 104, where each record corresponds to a resource 124 identifier, a demand value, and a timestamp. As used in this disclosure, a "demand metrics table" is a structured data store maintained in memory 104 by the apparatus 100 that records, organizes, and provides access to values representing resource demand 146 over time. In an embodiment, the demand metrics table may comprise rows or records, each corresponding to a resource 124 identifier, a demand value, and a timestamp. Without limitation, the demand value may represent occupancy percentage, transaction count, validation request frequency, or any other measurable condition that indicates the level of resource 124 utilization. In a non-limiting example, the demand metrics table may include entries such as: resource ID=parking facility A, demand value=82 percent occupancy, timestamp=10:05 AM. For example, without limitation, the demand metrics table may be queried by the processor 102 during validation workflows to retrieve the most recent demand data and determine whether to increase or decrease the quantity 132 of dual-key entitlements 134 applied to a validation.

With continued reference to FIG. 1, in an embodiment, the apparatus 100 may aggregate the processed demand data to generate meaningful trends and averages. Without limitation, the processor 102 may use sliding window counters, statistical functions, or analytics modules to calculate short-term and long-term demand levels. As used in this disclosure, "sliding window counters" are computational mechanisms executed by the processor 102 of the apparatus 100 that maintain a running count of events, values, or metrics within a continuously shifting time interval. In an embodiment, sliding window counters may allow the apparatus 100 to evaluate resource demand 146 over recent periods without requiring recalculation across the entire dataset. Without limitation, a sliding window counter may increment when a new validation event occurs and decrement when an older event falls outside the defined time interval. In a non-limiting example, a sliding window counter may track the number of validation requests within the most recent five minutes, updating continuously as time progresses. For example, without limitation, the apparatus 100 may use sliding window counters to enforce per-period caps 128 or to adjust key exchange rates dynamically based on short-term demand fluctuations. As used in this disclosure, "statistical functions" are mathematical operations implemented by the processor 102 of the apparatus 100 to analyze, aggregate, or summarize raw demand data stored in memory 104. In an embodiment, statistical functions may include averaging, median calculation, standard deviation, percentile evaluation, regression, or correlation measures applied to demand metrics. Without limitation, statistical functions may enable the apparatus 100 to identify trends, normalize noisy data, or detect anomalies in resource 124 utilization. In a non-limiting example, the apparatus 100 may calculate a moving average of validation requests per hour or determine the variance in parking occupancy rates across different times of day. For example, without limitation, the apparatus 100 may apply statistical functions to generate input values for governance rules 136 that dynamically adjust the assignment 120 of dual-key entitlements 134. As used in this disclosure, "analytics modules" are software components instantiated within the apparatus 100 that perform higher-level data processing and interpretation of demand metrics for decision-making within the governance layer. In an embodiment, analytics modules may be implemented as microservices, machine learning pipelines, or rule-based engines that operate on aggregated demand data. Without limitation, analytics modules may detect demand patterns, forecast future resource 124 usage, or recommend parameter adjustments to optimize key distribution. In a non-limiting example, an analytics module may analyze demand metrics to predict that parking occupancy will exceed ninety percent within the next hour, prompting the apparatus 100 to increase the exchange rate rule 138 for prepaid entitlement keys 140 in advance. For example, without limitation, analytics modules may continuously supply processed insights to the governance layer, ensuring that key assignment 120 decisions are both reactive to current demand and proactive to forecasted conditions. In a non-limiting example, the apparatus 100 may compute a five-minute moving average of validation requests to smooth out short spikes while maintaining responsiveness to sustained increases. For example, without limitation, aggregated data may be persisted in a metrics database or cached in memory 104 for rapid access by the governance layer.

With continued reference to FIG. 1, in an embodiment, the apparatus 100 may use the aggregated resource demand 146 information to influence key assignment 120 decisions within the governance layer. Without limitation, the processor 102 may evaluate governance rules 136 that map demand ranges to key exchange-rate adjustments or quota modifications. In a non-limiting example, when demand exceeds eighty percent occupancy, the governance layer may increase the quantity 132 of prepaid entitlement keys 140 required for a parking validation from two keys to four keys. For example, without limitation, when demand falls below thirty percent, the governance layer may reduce the exchange rate so that only one key is required for the same validation, thereby incentivizing usage during off-peak times. In an embodiment, the apparatus 100 may apply the resource demand 146 adjustments in real time to validation workflows. Without limitation, when an assignment 120 is received from a tenant application, the processor 102 may consult the latest resource demand 146 values stored in memory 104, apply the relevant exchange rate rule 138 or quota adjustment, and compute the final quantity of dual-key entitlements 134 to be deducted. In a non-limiting example, if a member requests a validation during peak hours, the apparatus 100 may apply the higher exchange rate rule 138 and deduct four keys instead of two, while ensuring that the deduction remains within per-event and per-period caps 128. For example, without limitation, the processor 102 may then write the updated key balances and demand-adjusted validation record to a ledger or distributed database, ensuring traceability and auditability of the demand-based adjustment.

With continued reference to FIG. 1, the at least a processor 102 may be further configured to generate a priority score 148 associated with the assignment 120 and rank a plurality of assignments 150 based on the priority score 148. As used in this disclosure, a "priority score" is a calculated value generated by the apparatus 100 that represents the relative importance, weight, or precedence of an assignment 120 in connection with the allocation or consumption of dual-key entitlements 134. In an embodiment, the priority score 148 may be derived by the processor 102 using governance rules 136 stored in memory 104 that incorporate factors such as entity protocols 126, member profile data 118, resource demand 146, or key availability. Without limitation, the priority score 148 may be a numerical value, categorical ranking, or weighted composite metric that enables the apparatus 100 to order multiple assignments 150 for processing. In a non-limiting example, the priority score 148 may assign higher precedence to validation requests originating from anchor tenants, loyalty-tier members, or critical resources such as emergency parking spaces. For example, without limitation, the apparatus 100 may generate a priority score 148 of ninety for a validation request from an anchor tenant during peak hours and a score of fifty for a standard tenant request, with the higher-scoring request being ranked and executed first when entitlements are limited. In an embodiment, the apparatus 100 may be configured to compute a priority score 148 using rule-based weighting logic stored in memory 104 and executed by at least a processor 102. Without limitation, the apparatus 100 may assign weight values to parameters such as tenant type, member profile tier, resource category, and current demand level. In a non-limiting example, the apparatus 100 may apply a weight of fifty points for anchor tenants, twenty points for gold-tier members, and thirty points for validations requested during peak hours, then sum these values to generate a composite priority score 148 of one hundred. For example, without limitation, this rule-based approach may allow the apparatus 100 to implement transparent, easily configurable ranking criteria aligned with operator policies. In an embodiment, the apparatus 100 may generate a priority score 148 through statistical models that evaluate demand conditions and historical usage patterns. As used in this disclosure, a "demand condition" is a measurable parameter that reflects the current level of utilization associated with a resource 124 to which dual-key entitlements 134 may be applied. In an embodiment, a demand condition may include occupancy rates, transaction volumes, validation request frequency, time-of-day utilization metrics, and the like. Without limitation, demand conditions may be captured in real time through sensors, system logs, transactional data, and the like, and may be processed by the apparatus 100 to determine whether adjustments to key allocation are warranted. In a non-limiting example, a demand condition may be a parking garage operating at ninety percent capacity. For example, without limitation, the apparatus 100 may respond to this demand condition by increasing the exchange rate for prepaid entitlement keys 140 applied to parking validations. As used in this disclosure, "historical usage patterns" are recurring behaviors, correlations, or trends derived from archived records of prior validations, resource 124 utilization, or key consumption that are analyzed by the apparatus 100 to predict or inform future governance decisions. In an embodiment, historical usage patterns may be identified from logs of validation requests, key ledger entries, or member activity histories stored in memory 104. Without limitation, historical usage patterns may include daily peaks, seasonal cycles, loyalty-member frequency, or tenant-specific allocation habits. In a non-limiting example, a historical usage pattern may show that validations consistently spike every weekday morning between 7:00 a.m. and 9:00 a.m.

For example, without limitation, the apparatus 100 may use this historical usage pattern to pre-allocate a larger share of operator-issued entitlement keys 144 for that period. Without limitation, the processor 102 may execute regression or scoring functions to identify correlations between high-demand conditions and the need for prioritized allocation of keys. In a non-limiting example, the apparatus 100 may calculate that when parking occupancy exceeds eighty percent, requests associated with recurring members statistically result in higher long-term value, and may assign those requests higher priority scores 148. For example, without limitation, statistical functions may be applied to the demand metrics table to derive numerical scores that are continuously updated as new data is received by the at least a processor 102. In an embodiment, the apparatus 100 may further employ analytics modules or machine learning classifiers to dynamically calculate priority scores 148 based on historical data and predictive models. Without limitation, the apparatus 100 may use supervised learning models trained on prior validation events to classify assignments 150 as high, medium, or low priority, with each classification mapped to a numerical score. In a non-limiting example, the apparatus 100 may detect that members with frequent repeat visits are highly correlated with increased tenant revenue and assign their validations higher scores automatically. For example, without limitation, this predictive scoring mechanism may be continuously refined as additional event data is collected, ensuring that the ranking system evolves with usage patterns. In an embodiment, once generated, the priority scores 148 may be aggregated and stored in a priority queue managed by the governance layer. Without limitation, the apparatus 100 may rank incoming assignments 150 by sorting their scores in descending order and process them sequentially until available entitlements are exhausted. In a non-limiting example, if five validation requests are pending but the remaining quota allows only three to be processed, the apparatus 100 may approve the three assignments 150 with the highest scores and deny or defer the other two. For example, without limitation, this may ensure that dual-key entitlements 134 are consumed in a manner that optimizes fairness, efficiency, and compliance with operator objectives.

With continued reference to FIG. 1, the at least a processor 102 may be further configured to settle the dual-key entitlements 134 in real time by decrementing operator-issued entitlement keys 144. As used in this disclosure, "operator-issued entitlement keys" are a category of dual-key entitlements 134 that are generated, allocated, and distributed by an operator for use by tenants under governance rules 136 defined within the configurable governance layer 106. In an embodiment, operator-issued entitlement keys 144 may be quota-based, non-transferable, and non-tradable digital assets that represent the operator's controlled allowance of validation capacity granted to one or more tenants. Without limitation, operator-issued entitlement keys 144 may be consumed by tenants when applying validation benefits to members, and the apparatus 100 may decrement these keys in real time upon approval of a validation request. In a non-limiting example, an operator may allocate fifty operator-issued entitlement keys 144 per tenant per month, with each validation event decrementing one key until the quota is exhausted. For example, without limitation, the apparatus 100 may enforce settlement of operator-issued entitlement keys 144 by maintaining a ledger of key balances in memory 104 and executing instructions to subtract a key from the tenant's balance immediately after each successful validation.

With continued reference to FIG. 1, the at least a processor 102 may be further configured to settle the dual-key entitlements 134 in real time by deducting prepaid entitlement keys 140 from an entity record 152. As used in this disclosure, a "prepaid entitlement key" is a category of dual-key entitlements 134 that are purchased in advance by a tenant and stored in an entity record 152 for later consumption in connection with validations. In an embodiment, prepaid entitlement keys 140 may function as digital credits that are deducted from a tenant's balance when the tenant authorizes a validation benefit to a member. Without limitation, prepaid entitlement keys 140 may be associated with exchange rate rules 138 that define the quantity 132 of keys required for a given resource 124, and may be consumed independently or in combination with operator-issued entitlement keys 144. In a non-limiting example, a tenant may purchase one thousand prepaid entitlement keys 140 at a negotiated rate, and the apparatus 100 may deduct ten keys each time a member requests a parking validation during peak hours, with deductions occurring in real time. For example, without limitation, the apparatus 100 may enforce settlement of prepaid entitlement keys 140 by maintaining the tenant's key account in memory 104, executing processor 102 instructions to subtract keys upon approval of a validation request, and recording the updated balance in a key ledger for auditability and transparency. With continued reference to FIG. 1, in an embodiment, the apparatus 100 may provide an improvement as a framework for entitlement governance in parking services and related offerings by addressing deep operational pain points through technical mechanisms that enhance computer system efficiency. Without limitation, the apparatus 100 may improve data throughput, response latency, and overall resource 124 allocation by enabling entitlement governance rules 136 to be executed in real time using processor-driven governance engines, memory-resident key ledgers, and configurable dashboards. In a non-limiting example, the apparatus 100 may receive a validation request from a tenant application, parse the request payload in microseconds, apply quota-based thresholds 142 from governance rules 136 pre-loaded into memory 104, and generate an output comprising a computed quantity of dual-key entitlements 134. For example, without limitation, the use of in-memory demand metrics tables and rule evaluation engines allows the apparatus 100 to generate outputs significantly faster than conventional post-billing systems, which rely on delayed reconciliation and manual adjustment. In an embodiment, the apparatus 100 may provide an improvement by eliminating uncontrolled, non-revenue transactions. Without limitation, the apparatus 100 may accomplish this using per-event and per-period cap enforcement modules, which compare validation requests against counters stored in memory 104 and enforce denial or adjustment decisions in real time. In a non-limiting example, a tenant attempting to grant a validation worth twenty keys when only a ten-key per-event cap 130 is allowed may receive an automated system-generated adjustment to the maximum permitted quantity, with the processor 102 writing the corrected transaction into the ledger without human intervention. For example, without limitation, this provides faster, more efficient governance by removing the need for manual auditing and correction. In an embodiment, the apparatus 100 may provide an improvement by preventing abuse by tenants through automated monitoring and machine-learning-based anomaly detection. Without limitation, the apparatus 100 may track historical usage patterns of each tenant in a demand metrics table and flag irregularities such as sudden spikes in key consumption. In a non-limiting example, a supervised learning classifier may be trained on tenant validation logs to predict expected daily key usage, and deviations beyond defined thresholds may trigger automatic suspension of validations until operator review. For example, without limitation, this improves system efficiency by preventing fraudulent or excessive transactions from consuming processor 102 and storage resources unnecessarily. In an embodiment, the apparatus 100 may provide an improvement by removing administrative burden associated with billing small amounts through its prepaid entitlement key mechanism. Without limitation, the apparatus 100 may store prepaid key balances in memory 104 and decrease them in real time with each transaction, thereby eliminating the need for asynchronous financial reconciliation. In a non-limiting example, rather than generating dozens of micro-invoices for small parking validations, the apparatus 100 may simply deduct keys from a prepaid balance and confirm settlement instantly through the entity dashboard. For example, without limitation, this allows faster output data and more efficient use of computing resources compared to conventional financial processing systems that batch transactions for end-of-month reconciliation. In an embodiment, the apparatus 100 may provide an improvement through differentiated allocation of multiple classes of entitlement keys under distinct dispersant rules. Without limitation, the configurable governance layer instantiated by processor 102 may be configured to store rule sets in memory 104 that may separately govern first-key allocations and second-key allocations, wherein each rule set may reference different configurable parameters. In a non-limiting example, first keys may represent prepaid consumable entitlements that may be subject to per-event caps, while second keys may represent bonus or promotional entitlements that may be subject to lifetime or rolling-period thresholds. Separate dispersant rule structures in the governance layer may allow the apparatus 100 to enforce allocation logic that may distinguish between key types without requiring duplication of system components. In an embodiment, the apparatus 100 may provide an improvement through user customization of dispersant rules via governance layer parameterization. Without limitation, an entity accessing the governance layer using its profile may configure parameters such as maximum caps, decay rates, rollover periods, or prioritization order between key types. In a non-limiting example, a parking operator may configure the governance layer so that bonus keys may be consumed before prepaid keys, with bonus keys subject to a monthly expiration parameter. For example, without limitation, this may permit granular alignment of entitlement behavior with operator business models, while the underlying enforcement may remain automated through processor 102 and memory 104. In an embodiment, the apparatus 100 may provide an improvement through dynamic modification of dispersant rules without requiring recompilation of system code. Without limitation, governance layer parameters may be altered in real time by authorized entities, and the updated configuration may immediately govern entitlement determinations on subsequent transactions. In a non-limiting example, an operator observing a seasonal surge in demand may temporarily increase a per-period cap parameter for second keys to encourage adoption, and processor 102 may enforce the new threshold without manual auditing or ledger correction. For example, without limitation, this may improve system flexibility, may reduce downtime associated with reconfiguration, and may ensure that entitlement determinations remain consistent with evolving policies. In an embodiment, the apparatus 100 may provide an improvement by introducing behavioral flexibility without financial leakage. Without limitation, this may be achieved through exchange rate rules 138 dynamically adjusted by the processor 102 based on resource demand 146 metrics stored in the demand metrics table. In a non-limiting example, when parking occupancy exceeds eighty percent, the apparatus 100 may automatically increase the prepaid key exchange rate from one key per hour to two keys per hour, ensuring demand is throttled without additional operator input. For example, without limitation, this real-time adjustment reduces latency and allows more efficient processing than legacy systems that require manual rule changes by an administrator. In an embodiment, the apparatus 100 may provide an improvement by offering strong operator oversight without micromanaging every transaction. Without limitation, this may be achieved through the operator dashboard, which aggregates key usage data, tenant activity, and rule enforcement metrics into a centralized interface updated in near real time through API calls and event streaming. In a non-limiting example, the operator dashboard may display a live counter of remaining operator-issued keys across all tenants, with automated alerts generated when a tenant approaches quota thresholds. For example, without limitation, this aggregation allows the operator to intervene at the rule level rather than reviewing thousands of individual transactions, thereby improving system efficiency by reducing computational overhead associated with transaction-by-transaction review. In an embodiment, the overall framework provided by the apparatus 100 may constitute an improvement of a computer system itself because it introduces a structured entitlement governance layer that reduces processing complexity, minimizes latency, and optimizes storage operations. Without limitation, conventional validation systems may rely on batch processing, human oversight, and manual reconciliation, leading to slower outputs and inefficient use of computing resources. In a non-limiting example, by loading governance rules 136 into memory 104, applying machine-learning models to classify demand conditions, and using in-memory key ledgers updated through event-driven processing, the apparatus 100 may generate output data such as key deductions or priority scores 148 in milliseconds. For example, without limitation, this constitutes an improvement over prior approaches by delivering faster output data, more efficient processing, and scalable entitlement governance for parking and related services.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
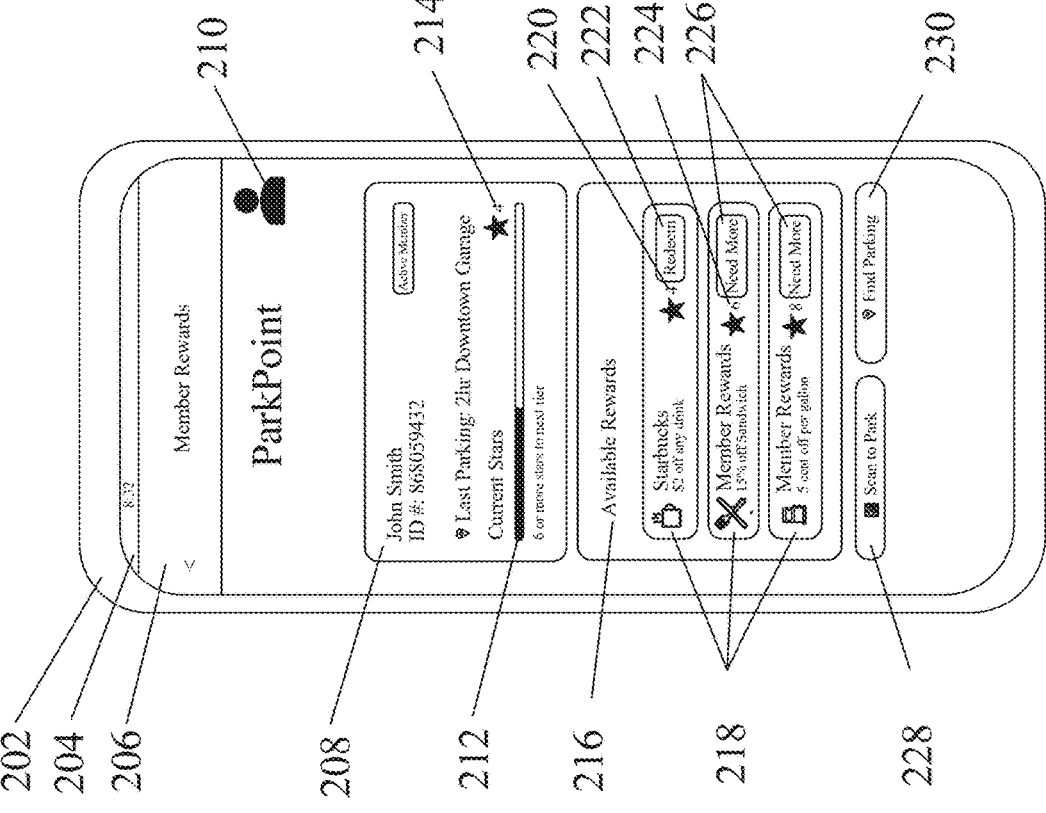
FIG. 2A is an exemplary illustration of a graphical user interface displaying a member portal comprising a quantity of dual-key entitlements.

Referring now to FIG. 2A, an exemplary illustration 200*a* of a graphical user interface displaying a member portal comprising a quantity of dual-key entitlements. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 204. For example, links to decentralized platforms as described in this disclosure may be incorporated using icons. Using an icon may be a fast way to open documents, run programs etc. because clicking on them yields instant access.

With continued reference to FIG. 2A, in an embodiment, the graphical user interface 204 and an event handler may operate together to enable seamless interaction between the user and the apparatus 200. The GUI serves as the visual and interactive layer through which the user engages with the apparatus 200, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 200 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 2A, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 2A, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 204. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 2A, in an embodiment, the apparatus 200 and or the downstream device 202 may include a data structure. As used in this disclosure, "data structure" is a way of organizing data represented in a specialized format on a computer configured such that the information can be effectively presented in a graphical user interface 204. In some cases, the data structure includes any input data. In some cases, the data structure contains data and/or rules used to visualize the graphical elements within a graphical user interface 204. In some cases, the data structure may include any data described in this disclosure. In some cases, the data structure may be configured to modify the graphical user interface 204, wherein data within the data structure may be represented visually by the graphical user interface 204. In some cases, the data structure may be continuously modified and/or updated by processor, wherein elements within graphical user interface 204 may be modified as a result. In some cases, processor may be configured to transmit display device and or the downstream device 202 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor may transmit the data described above to a database wherein the data may be accessed from the database. Processor may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 2A, as used in this disclosure, an "interactive element" is a component or feature within a graphical user interface 204 (GUI) that allows users to perform actions, provide input, or engage with the apparatus. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 2A, as used in this disclosure, "downstream device" is a device that accesses and interacts with apparatus. For instance, and without limitation, downstream device 202 may include a remote device and/or apparatus. In a non-limiting embodiment, downstream device 202 may be consistent with a computing device as described in the entirety of this disclosure. Without limitation, the downstream device 202 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor be connected to display device. In one or more embodiments, transmitting the member portal may include displaying the member portal at display device using a visual interface.

With continued reference to FIG. 2A, in an embodiment, the GUI 204 may display a header 206. As used in this disclosure, a "header" is a graphical display element rendered within the GUI 204 that provides a contextual title or navigation indicator for the member portal. In an embodiment, the header 206 may display the application section currently in use, such as Member Rewards. Without limitation, the header may be implemented as a static or dynamic banner displayed at the top of the interface. In a non-limiting example, the header 206 may allow the member to quickly recognize that they are viewing the rewards section of the application. In an embodiment, the GUI 204 may display a member profile 208. As used in this disclosure, a "member profile" is a graphical element displayed within the GUI 204 that presents information associated with a specific member account. In an embodiment, the member profile 208 may display identifiers such as the member's name, account ID, and membership status. Without limitation, the member profile 208 may also present recent activity information, such as the last parking session or validation performed. In a non-limiting example, member profile 208 may display John Smith, ID #868059432, and a label Active Member. In an embodiment, the GUI 204 may display a profile icon 210. As used in this disclosure, a "profile icon" is a graphical symbol rendered within the GUI 204 that represents a member's account and may be used for navigation to detailed account settings. In an embodiment, the profile icon may be presented as a user silhouette or avatar. In a non-limiting example, profile icon 210 may be selected to open account settings for the member. In an embodiment, the GUI 204 may display a current stars indicator 212. As used in this disclosure, a "current stars indicator" is a graphical display element rendered within the GUI 204 that communicates a member's current balance of stars or operator-issued entitlement keys. In an embodiment, the indicator may be implemented as a progress bar, numeric field, or icon array. In a non-limiting example, current stars indicator 212 may show the text 6 or more stars to next tier to reflect progress toward a new reward level. In an embodiment, the GUI 204 may display a quantity of stars 214. As used in this disclosure, a "quantity of stars" is a numerical value displayed within the GUI 204 that indicates the total count of stars accumulated by the member. In an embodiment, the apparatus may dynamically update this field in response to entitlement transactions. In a non-limiting example, quantity of stars 214 may display a current balance of 12 stars within GUI 204. In an embodiment, the GUI 204 may display an available awards 216. As used in this disclosure, an "available awards" field is a graphical section of the GUI 204 that displays rewards eligible for redemption by the member. In an embodiment, available awards may be organized by merchant, service, or discount type. In a non-limiting example, available awards 216 may list a Starbucks reward offering $2 off any drink. In an embodiment, the GUI 204 may display a list of rewards 218. As used in this disclosure, a "list of rewards" is a structured enumeration of individual reward items displayed within the available awards section of the GUI 204. In an embodiment, each entry may include a reward description, cost in stars, and associated redemption actions. In a non-limiting example, list of rewards 218 may include entries such as 15% off sandwich or 5 cents off per gallon. In an embodiment, the GUI 204 may display a quantity of stars requirement 220. As used in this disclosure, a "quantity of stars requirement" is a graphical display element rendered within the GUI 204 that specifies the number of stars a member must hold in order to redeem a particular reward. In an embodiment, the apparatus may compare the member's current star balance against this requirement in real time. In a non-limiting example, quantity of stars requirement 220 may specify 10 stars required to redeem a Starbucks reward. In an embodiment, the GUI 204 may display a "Redeem" button 222. As used in this disclosure, a "Redeem button" is a selectable control rendered within the GUI 204 that enables a member to consume stars and claim a reward. In an embodiment, the redeem button may trigger the apparatus to decrement the member's balance and generate an authorization key. In a non-limiting example, redeem button 222 may allow a member to immediately claim the Starbucks reward listed in GUI 204. In an embodiment, the GUI 204 may display a second quantity of stars requirement 224. As used in this disclosure, a "second quantity of stars requirement" is a graphical display element rendered within the GUI 204 that specifies a different required star balance for a separate reward. In an embodiment, this may correspond to distinct entitlement thresholds. In a non-limiting example, second quantity of stars requirement 224 may indicate that 20 stars are required to redeem a 15% off sandwich reward. In an embodiment, the GUI 204 may display a "Need More" button 226. As used in this disclosure, a "Need More button" is a selectable control rendered within the GUI 204 that indicates a member does not currently have enough stars to redeem a selected reward. In an embodiment, selecting the button may redirect the member to options for earning additional stars. In a non-limiting example, need more button 226 may display when a member with 14 stars attempts to claim a reward requiring 20 stars. In an embodiment, the GUI 204 may display a "Scan to Park" button 228. As used in this disclosure, a "Scan to Park button" is a selectable control rendered within the GUI 204 that enables a member to initiate a parking validation workflow. In an embodiment, activation of this control may generate and display an authorization key, such as a QR code, for validation. In a non-limiting example, scan to park button 228 may present a scannable QR code for entry into a partner garage. In an embodiment, the GUI 204 may display a "Find Parking" button 230. As used in this disclosure, a "Find Parking button" is a selectable control rendered within the GUI 204 that enables a member to request discovery of available parking facilities. In an embodiment, the button may trigger a location service or database query to identify garages that accept validations. In a non-limiting example, find parking button 230 may display a map of nearby garages that accept dual-key entitlements.

Figure 2B:
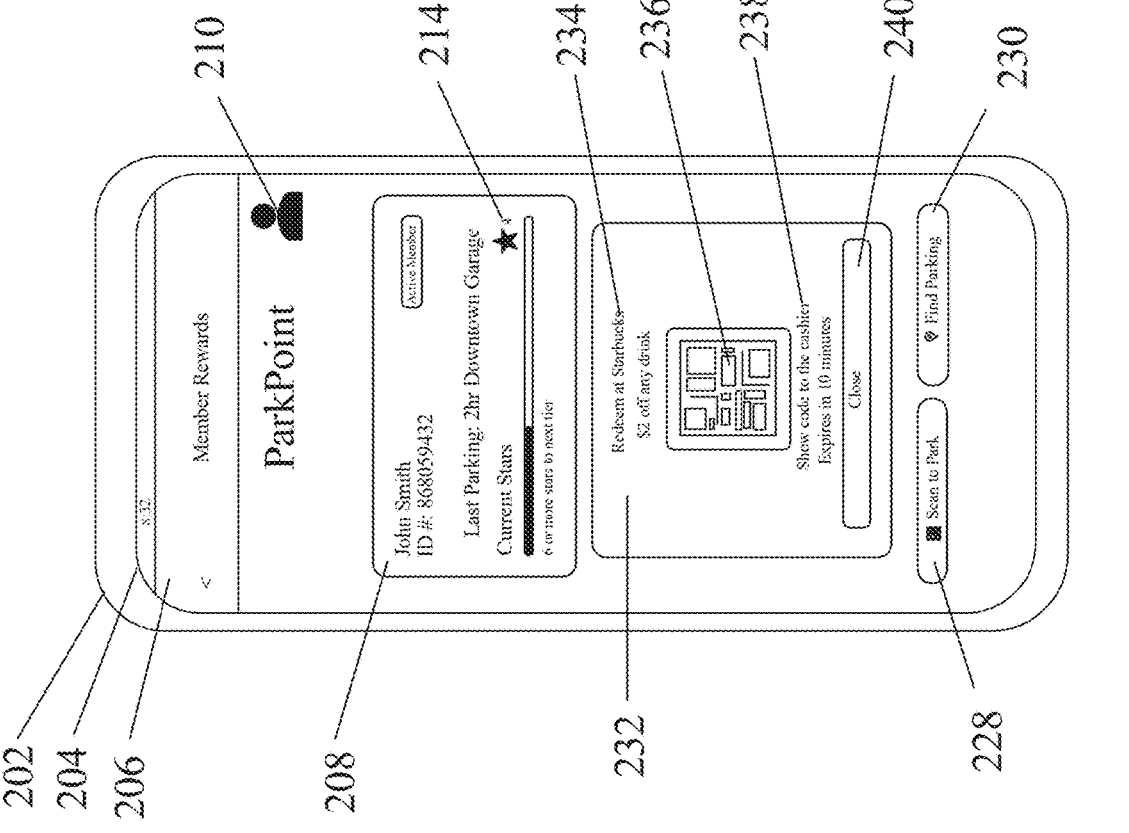
FIG. 2B is an exemplary illustration of a graphical user interface displaying a member portal comprising an authorization key.

Referring now to FIG. 2B, an exemplary illustration 200b of a graphical user interface displaying a member portal comprising an authorization key. In an embodiment, the illustration 200b may include a pop-up window 232. As used in this disclosure, a "pop-up window" is a graphical user interface element generated by the apparatus that overlays an existing display to present context-specific information or controls without requiring navigation away from the underlying interface. In an embodiment, the illustration 200b may include a pop-up window 232. The pop-up window may be instantiated by the processor in response to a member interaction, such as selecting a reward redemption option within GUI 204. Without limitation, the pop-up window may be configured to display an authorization key generated by the apparatus for validation of a resource or reward. In a non-limiting example, pop-up window 232 may display a text label indicating the entity name 234, a machine-readable authorization key such as a QR code, and an instruction 238 directing the member to present the code to a cashier or validation device. As used in this disclosure, an "authorization key" is a machine-generated digital credential created and managed by the apparatus to authenticate, validate, and permit a member to access or consume a validation benefit associated with dual-key entitlements. In an embodiment, the authorization key 236 may be generated by the processor in response to a member request and may encode information such as member identifiers, entity record identifiers, resource identifiers, entitlement balances, and applicable governance rules. Without limitation, the authorization key 236 may be implemented as an alphanumeric string, QR code, barcode, cryptographic hash, or near-field communication signal that is communicated from the member portal to a validation endpoint. In a non-limiting example, the authorization key 236 may be displayed on a member portal as a scannable QR code, which when presented at a parking gate, is parsed by the apparatus, verified against governance rules, and resolved into a validated deduction of prepaid entitlement keys. For example, without limitation, the authorization key 236 may ensure that members receive entitlements securely and in compliance with entity protocols, while enabling the apparatus to process validations in real time without requiring direct manual approval. In an embodiment, the GUI 204 may include an entity name 234. As used in this disclosure, an "entity name" is a graphical display element rendered within the GUI 204 that identifies the tenant or merchant associated with a particular reward or entitlement redemption. In an embodiment, the entity name may be presented as a text label within the reward redemption window. Without limitation, the entity name may assist the member in recognizing the provider of the benefit being redeemed. In a non-limiting example, entity name 234 may display Redeem at Starbucks $2 off any drink within GUI 204, indicating that the entitlement key corresponds to a Starbucks reward. In an embodiment, the GUI 204 may include an instruction 238. As used in this disclosure, an "instruction" is a textual or graphical element rendered within the GUI 204 that provides guidance to the member regarding how to complete a reward redemption or validation process. In an embodiment, the instruction may include steps such as presenting an authorization key, scanning a QR code, or showing a code to a cashier. Without limitation, the instruction may include expiration conditions or additional rules for use. In a non-limiting example, instruction 238 may display the text Show code to the cashier-Expires in 10 minutes beneath a QR code presented within GUI 204. In an embodiment, the GUI 204 may include a close button 240. As used in this disclosure, a "close button" is a selectable control rendered within the GUI 204 that allows a member to dismiss or exit from a displayed redemption or validation window. In an embodiment, selecting the close button may return the member to a previous interface state, such as the available rewards list. Without limitation, the close button may be implemented as a graphical button labeled with text such as Close or represented by an icon. In a non-limiting example, close button 240 may be selected by the member after viewing a Starbucks reward authorization key to return to the rewards overview screen of GUI 204.

Figure 3A:
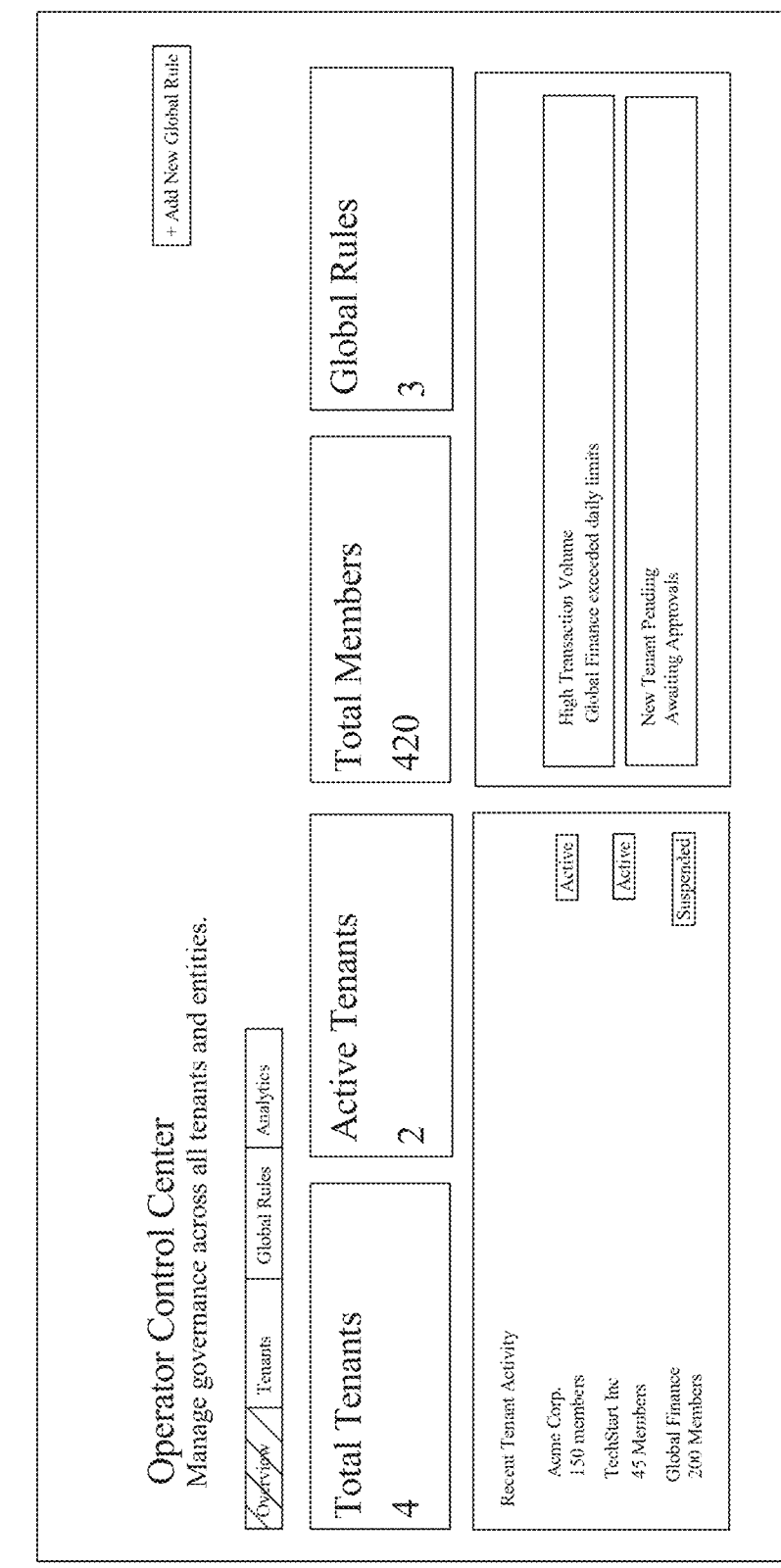
FIG. 3A is an exemplary illustration of a graphical user interface displaying an operator dashboard comprising an overview window view.

Referring now to FIG. 3A, an exemplary illustration 300*a* of a graphical user interface displaying an operator dashboard comprising an overview window view. As used in this disclosure, an "operator dashboard" is a graphical user interface generated by the apparatus that provides an operator with a centralized control panel for monitoring, managing, and enforcing governance functions across tenants, members, and resources. In an embodiment, the operator dashboard may comprise overview windows, control elements, and notification areas that display real-time system metrics and actionable events. Without limitation, the operator dashboard may include fields such as total tenants, active tenants, total members, and global rules, as well as panels for recent tenant activity and system alerts. In a non-limiting example, the operator dashboard may display that four tenants are registered, two tenants are active, and three global rules are currently in effect, while simultaneously alerting the operator that a global finance threshold has been exceeded. For example, without limitation, the operator dashboard may be implemented as a web-based or application-based interface communicatively connected to the configurable governance layer, thereby allowing operators to create global rules, approve tenant onboarding, and monitor key distribution in near real time. Without limitation, the operator dashboard may be configured to present governance information across all tenants and entities within the configurable governance layer, enabling the operator to monitor, manage, and enforce global rules. In a non-limiting example, the dashboard may include a control header labeled Operator Control Center, which allows the operator to navigate between different functional views such as tenants, global rules, and analytics. For example, without limitation, the operator dashboard may include a control element for adding a new global rule, enabling operators to define new governance policies in real time. In an embodiment, the overview window view may display summary metrics associated with system usage. Without limitation, these summary metrics may include the total number of tenants, the number of active tenants, the total number of members, and the total number of global rules currently in effect. In a non-limiting example, as shown in FIG. 3A, the operator dashboard may display a total of four tenants, two active tenants, 420 members, and three global rules. For example, without limitation, these summary fields may be dynamically updated by the apparatus as tenant and member activity occurs within the governance system. In an embodiment, the operator dashboard may further include sub-windows presenting recent tenant activity and operator notifications. Without limitation, the recent tenant activity window may display tenant identifiers along with associated activity metrics, such as key balances, member counts, or status indicators including active or suspended. In a non-limiting example, FIG. 3A illustrates tenant entries such as Acme Corp with 150 members and TechStart Inc. with 65 members, each entry also displaying a tenant status label. For example, without limitation, this feature may allow the operator to rapidly assess tenant participation and identify inactive or suspended tenants requiring intervention. In an embodiment, the notification window may provide real-time alerts or system events requiring operator attention. Without limitation, notifications may include system-detected conditions such as high transaction volumes, global finance thresholds exceeded, or pending tenant onboarding requests. In a non-limiting example, FIG. 3A illustrates a notification that global finance has exceeded daily limits, as well as a pending tenant posting awaiting operator approval. For example, without limitation, these notifications may be generated automatically by governance rules executed by the processor and may assist the operator in managing exceptions or applying corrective action. In an embodiment, the operator dashboard overview window view may function as a centralized control panel for visualizing system health, tenant activity, member participation, and governance rule enforcement. Without limitation, the dashboard may be implemented as a web-based graphical user interface generated by instructions stored in memory and executed by the processor of the apparatus. In a non-limiting example, the dashboard may poll backend databases at regular intervals to update displayed tenant counts, key consumption, and member totals, ensuring that the operator has near real-time situational awareness. For example, without limitation, this operator-facing dashboard may provide a comprehensive view of the governance system, allowing efficient oversight, rule creation, and activity monitoring across the entire ecosystem of tenants and members.

Referring now to FIG. 3B, an exemplary illustration 300*b* of a graphical user interface displaying an operator dashboard comprising a tenants window view. Without limitation, the tenants window view may provide the operator with a structured listing of tenants within the governance system, enabling oversight of tenant status, membership counts, governance rules, and activity history. In a non-limiting example, the tenants window view may include a table with fields for tenant name, status, members, active rules, last activity, and operator actions. For example, without limitation, the tenants window view may allow the operator to review and edit governance configurations for each tenant individually. In an embodiment, the tenants window view may display tenant identifiers alongside their operational status. Without limitation, the status field may indicate whether a tenant is active, suspended, or pending approval. In a non-limiting example, FIG. 3B illustrates tenants including Acme Corp. and TechStart Inc. with status set to Active, Global Finance with status set to Suspended, and Crypto Ventures with status set to Pending. For example, without limitation, these indicators may be dynamically updated by the apparatus based on tenant activity or operator-defined conditions, ensuring that the operator has real-time visibility into tenant participation. In an embodiment, the tenants window view may also display numerical data such as the number of members associated with each tenant and the number of active rules currently applied. Without limitation, the apparatus may generate these values by querying tenant profiles stored in memory and rendering them within the graphical user interface. In a non-limiting example, FIG. 3B shows that Acme Corp. has 150 members and 8 active rules, while Global Finance has 200 members and 12 active rules. For example, without limitation, this data presentation allows the operator to assess tenant scale and governance configuration at a glance. In an embodiment, the tenants window view may further provide historical data in the form of a last activity field. Without limitation, this field may display the most recent date on which a tenant interacted with the governance system. In a non-limiting example, FIG. 3B shows last activity dates such as 2025 Aug. 10 for TechStart Inc. and 2025 Sep. 8 for Crypto Ventures. For example, without limitation, this field may allow the operator to identify inactive or dormant tenants that may require intervention. In an embodiment, the tenants window view may include an actions field comprising operator-editable controls. Without limitation, the apparatus may display action buttons such as Edit adjacent to each tenant entry, enabling the operator to modify governance rules, update status, or review tenant profile details. In a non-limiting example, selecting the Edit button for Acme Corp. may open a tenant configuration panel where the operator can adjust key quotas or validation protocols. For example, without limitation, this action control allows the operator to directly manage tenant governance through the dashboard interface. In an embodiment, the tenants window view of the operator dashboard may therefore function as a centralized interface for tenant-level governance, providing the operator with visibility, control, and actionable insights across all tenants in the system. Without limitation, this view may be implemented as part of a modular web-based interface rendered by the apparatus and updated in near real time through continuous synchronization with backend tenant databases. In a non-limiting example, the operator may use the tenants window view to approve a pending tenant, suspend a non-compliant tenant, or allocate additional entitlement keys to an active tenant. For example, without limitation, this configuration ensures that tenant governance remains consistent, transparent, and aligned with operator-defined policies.

Figure 3C:
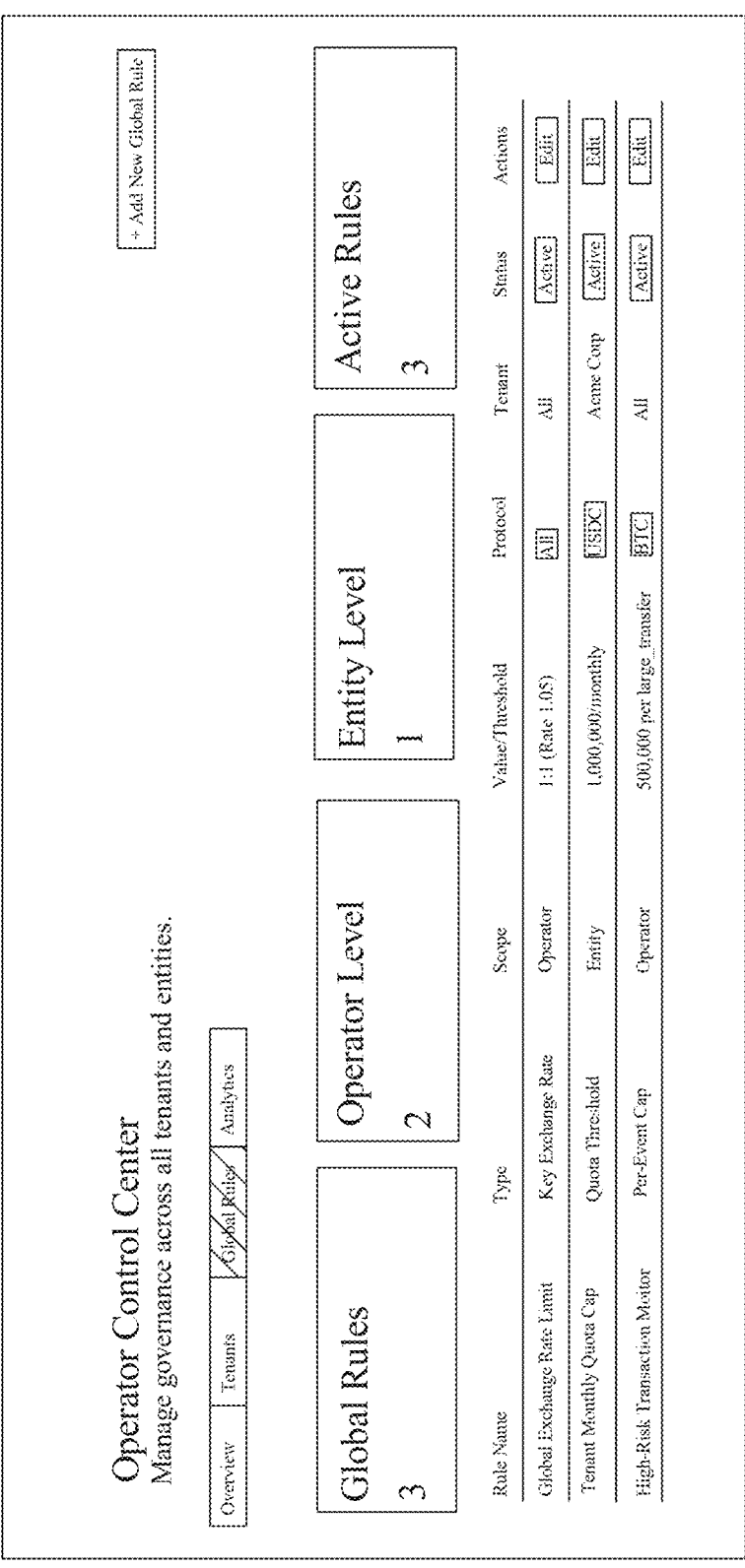
FIG. 3C is an exemplary illustration of a graphical user interface displaying an operator dashboard comprising a global rules window view.

Referring now to FIG. 3C, an exemplary illustration 300c of a graphical user interface displaying an operator dashboard comprising a global rules window view. Without limitation, the global rules window view may provide the operator with visibility into governance rules that are applied system-wide or scoped to specific entities, enabling oversight, modification, and enforcement of entitlement policies. In a non-limiting example, the global rules window view may present high-level metrics including the total number of global rules, the number of operator-level rules, the number of entity-level rules, and the number of active rules currently enforced by the governance layer. For example, without limitation, the apparatus may dynamically update these metrics in real time to reflect rule creation, modification, or suspension events. In an embodiment, the global rules window view may further display a detailed rules table comprising fields such as rule name, type, scope, value or threshold, protocol, tenant applicability, status, and operator actions. Without limitation, each rule entry may describe the governance parameter being enforced, the level of scope to which the rule applies, and the associated limits or exchange rates. In a non-limiting example, FIG. 3C illustrates rules including a Global Exchange Rate Limit of 1:1 with a rate of 1.05 applied at the operator scope, a Tenant Monthly Quota Cap of one million keys per month applied to Acme Corp., and a High-Risk Transaction Monitor rule defining a per-event cap of 500,000 per large transfer under the Bitcoin protocol. For example, without limitation, each of these rules may include a status indicator set to active and may be edited by selecting an operator control button such as Edit adjacent to the rule entry. In an embodiment, the global rules window view may enable the operator to add new rules by selecting a control element such as +Add New Global Rule, which launches a configuration interface for defining new governance parameters. Without limitation, this feature may allow the operator to establish new exchange rate rules, update per-period or per-event caps, or suspend existing rules as system conditions evolve. In a non-limiting example, the operator may create a new rule that restricts validations during specific hours or introduces dynamic pricing tied to resource demand conditions. For example, without limitation, the apparatus may enforce such rules immediately after creation, ensuring real-time governance adjustments. In an embodiment, the global rules window view may thus function as a centralized interface within the operator dashboard for comprehensive governance management. Without limitation, the apparatus may implement the global rules window view as a web-based or application-based interface connected to backend governance engines that store rule definitions, enforce thresholds, and apply exchange-rate logic. In a non-limiting example, the apparatus may use the global rules window view to show operators the real-time status of system-wide governance and provide them with direct tools for managing entitlement key distribution at both the operator and entity levels. For example, without limitation, this allows operators to configure governance consistently across all tenants while retaining flexibility for tenant-specific rules when required.

Figure 4A:
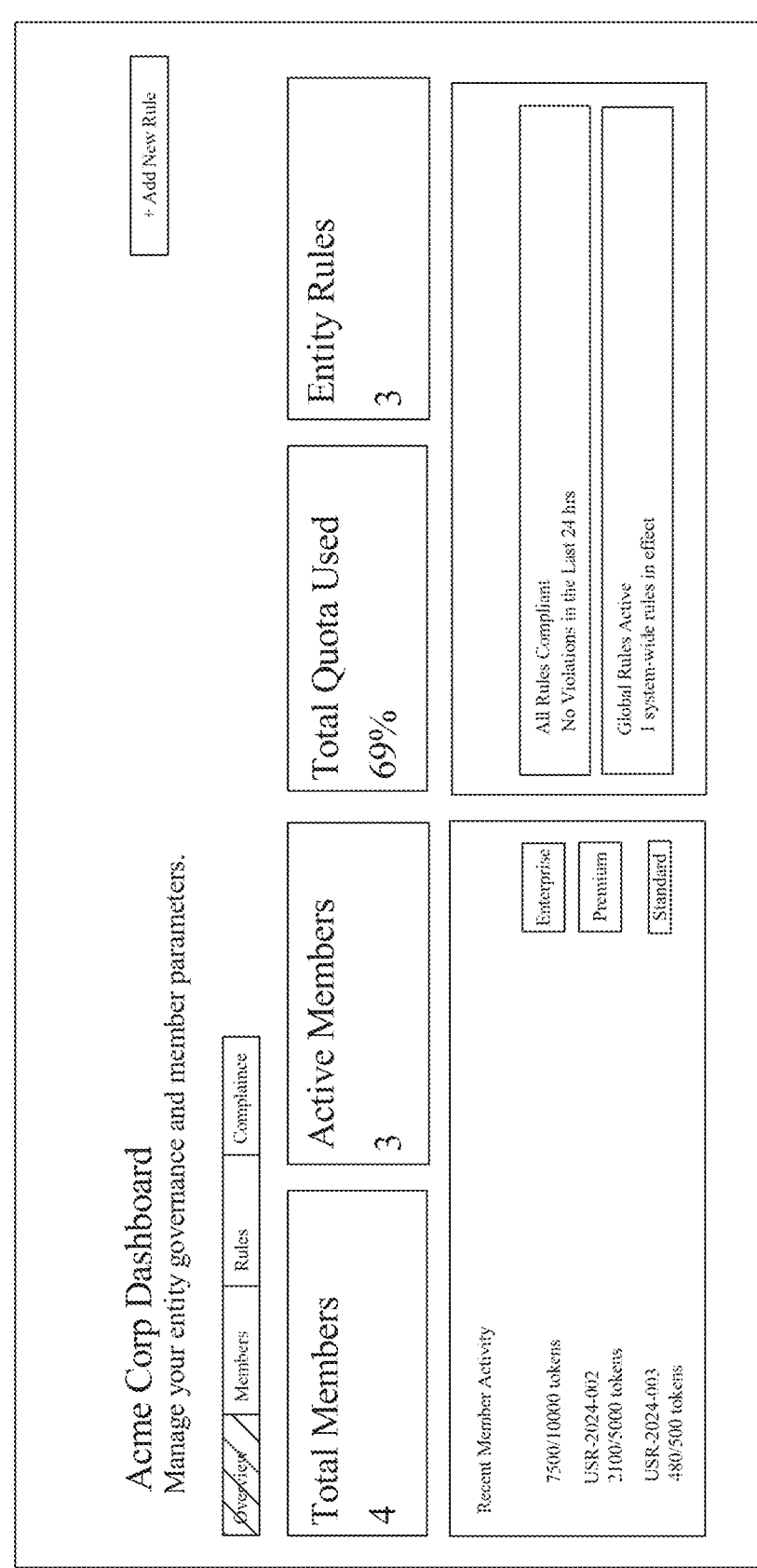
FIG. 4A is an exemplary illustration of a graphical user interface displaying an entity dashboard comprising an overview tab.

Referring now to FIG. 4A, an exemplary illustration 400a of a graphical user interface displaying an entity dashboard comprising an overview tab. As used in this disclosure, an "entity dashboard" is a graphical user interface generated by the apparatus that provides a tenant or entity with a centralized control panel for monitoring, managing, and configuring governance parameters associated with members, rules, quotas, and compliance. In an embodiment, the entity dashboard may comprise one or more tabbed views, including an overview tab, a members tab, a rules tab, and a compliance tab, each configured to present real-time data relevant to the entity's governance activity. Without limitation, the entity dashboard may display metrics such as the total number of members, the number of active members, the percentage of quota consumed, and the number of entity-specific rules currently enforced. In a non-limiting example, referring to FIG. 4A, the entity dashboard for Acme Corp. may show a total of four members, three of which are active, with a total quota usage of sixty-nine percent and three entity rules in effect. The entity dashboard may further display recent member activity, including key consumption by individual members, and may categorize members under roles or tiers such as enterprise, premium, or standard. For example, without limitation, the entity dashboard may also include a compliance section reporting whether rules have been violated within the last twenty-four hours and whether global rules are currently active. In an embodiment, the entity dashboard may further provide interactive controls enabling the entity to create new rules, edit existing rules, or monitor quota thresholds. Without limitation, the apparatus may implement the entity dashboard as a web-based or application-based interface, continuously updated by querying backend databases and applying governance rules stored in memory. For example, without limitation, this allows tenants to manage their key allocations, member entitlements, and compliance responsibilities in real time, while maintaining alignment with operator-defined governance policies enforced through the configurable governance layer. Referring now to FIG. 4B, an exemplary illustration 400b of a graphical user interface displaying an entity dashboard comprising a members tab. Without limitation, the members tab may provide the entity with a detailed listing of member accounts, including identifiers, account types, last activity, status, and key usage, thereby allowing the entity to monitor and manage member-level governance. In a non-limiting example, the members tab may display data in a structured table format with an action field enabling the entity to edit or update individual member configurations. For example, without limitation, this view may allow tenant administrators to adjust quotas, change membership tiers, or deactivate accounts as needed. In an embodiment, the members tab may include a column for Member ID, uniquely identifying each member associated with the entity. Without limitation, the apparatus may generate and store these identifiers in memory, linking them to member profile data such as entitlement balances and validation history. In a non-limiting example, FIG. 4B illustrates members USR-2024-001 through USR-2024-004, each associated with account data. For example, without limitation, this ensures that each member's entitlements are individually trackable within the governance system. In an embodiment, the members tab may also display an Account Type column, identifying whether the member is associated with tiers such as enterprise, premium, or standard. Without limitation, these account types may determine the rules or exchange-rate parameters applied during validations. In a non-limiting example, an enterprise account may be entitled to higher key quotas, while a standard account may be limited to smaller balances. For example, without limitation, these account types may be configurable by the entity through the edit function provided in the members tab. In an embodiment, the members tab may further include a Last Activity column, providing a timestamp of the most recent member interaction with the governance system. Without limitation, the apparatus may populate this field by updating logs whenever a validation request or key transaction is processed. In a non-limiting example, FIG. 4B shows activity dates such as 2025 Aug. 10 for a premium member account and 2025 Feb. 3 for a standard account. For example, without limitation, this information may help the entity identify inactive members that may require follow-up or removal. In an embodiment, the members tab may include a Status column reflecting whether a member is active or inactive. Without limitation, the apparatus may determine member status automatically based on validation activity or may allow the entity to manually set the status through the edit function. In a non-limiting example, FIG. 4B shows USR-2024-003 as inactive, while other members remain active. For example, without limitation, this enables the entity to suspend or reactivate members in accordance with governance policies. In an embodiment, the members tab may include a Key Usage column that tracks the number of entitlement keys consumed relative to the total keys allocated. Without limitation, this provides a clear measure of how close each member is to their quota or cap. In a non-limiting example, FIG. 4B shows USR-2024-001 with 7,500 keys consumed out of 10,000 allocated, and USR-2024-004 with 150 keys consumed out of 500 allocated. For example, without limitation, the entity may use this data to reallocate keys or enforce caps when balances approach exhaustion. In an embodiment, the members tab may also provide an Action column containing editable controls. Without limitation, the action field may include buttons such as Edit, allowing the entity to modify a member's account type, quota, or key assignment rules. In a non-limiting example, selecting the Edit button for USR-2024-002 may allow the entity to increase that member's quota from 5,000 keys to 7,500 keys. For example, without limitation, this enables fine-grained control over member-level governance and ensures that entities can dynamically manage entitlements. In an embodiment, the members tab of the entity dashboard may therefore function as a comprehensive interface for managing member governance, providing the entity with detailed visibility and control over individual accounts. Without limitation, this view may be implemented as a web-based or application-based interface connected to backend member profile databases and key ledgers, updated in near real time. For example, without limitation, the entity may use the members tab to allocate keys, monitor consumption, and maintain compliance with both entity-level and operator-level governance rules.

Figure 4C:
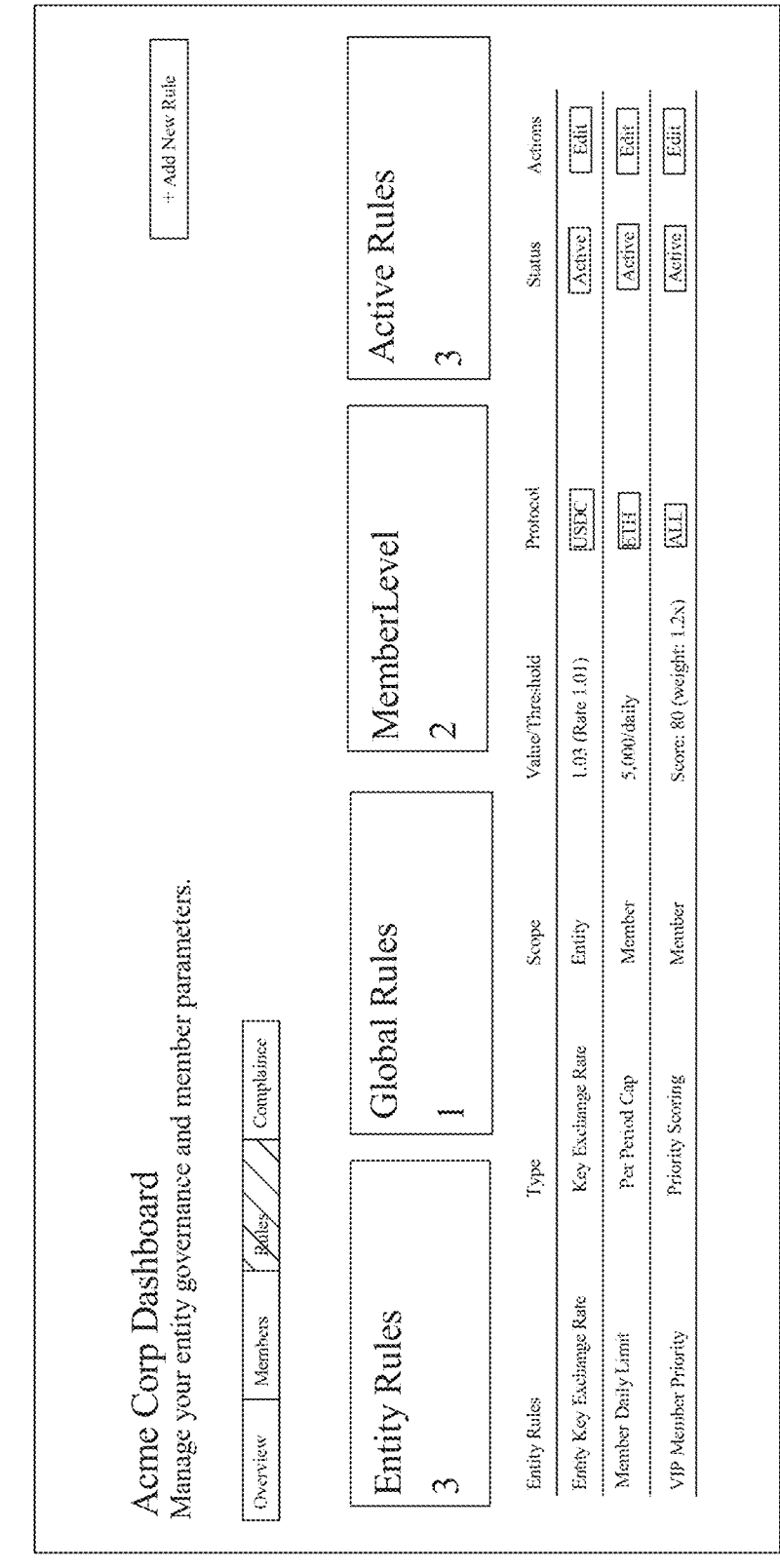
FIG. 4C is an exemplary illustration of a graphical user interface displaying an entity dashboard comprising a rules tab.

Referring now to FIG. 4C, an exemplary illustration 400c of a graphical user interface displaying an entity dashboard comprising a rules tab. Without limitation, the rules tab may provide an entity with visibility and control over governance rules that apply specifically to the entity and its members, while also displaying relevant global rules enforced by the operator. In a non-limiting example, the rules tab may present summary metrics such as the total number of entity rules, the number of global rules applicable to the entity, the number of member-level rules, and the number of active rules currently enforced. For example, without limitation, these summary values may be dynamically updated by the apparatus to reflect the real-time governance environment. In an embodiment, the rules tab may further display a rules table comprising fields such as rule name, type, scope, value or threshold, protocol, status, and operator actions. Without limitation, this table may provide a structured view of all governance rules affecting the entity, whether defined locally by the entity or globally by the operator. In a non-limiting example, FIG. 4C illustrates entity rules including an Entity Key Exchange Rate rule defining a conversion of 1.03 with a weight of 1.01 under the USDC protocol, a Member Daily Limit rule enforcing a per-period cap of 5,000 keys per day under the ETH protocol, and a VIP Member Priority rule applying a priority scoring value of 80 with a 1.2× weight across all members. For example, without limitation, each of these rules is displayed with an active status and includes an Edit control for modification. In an embodiment, the rules tab may further allow the entity to add new rules through an interactive control such as +Add New Rule. Without limitation, selecting this control may enable the entity to define new governance parameters including key exchange rates, per-period caps, or priority scoring rules for specific member tiers. In a non-limiting example, a new rule may be created to restrict weekend validations to a maximum of 1,000 keys per member. For example, without limitation, once defined, such rules may be stored in memory by the apparatus and enforced in real time when member assignments are processed. In an embodiment, the rules tab may function as a centralized interface for configuring, monitoring, and modifying governance rules at the entity level. Without limitation, the apparatus may implement the rules tab as a web-based interface connected to backend governance databases, ensuring that rule changes are immediately synchronized and enforced across validation events. In a non-limiting example, the entity may use the rules tab to adjust key exchange rates in response to operator pricing changes, enforce member-specific quotas, or assign higher priority scores to VIP members. For example, without limitation, this provides the entity with fine-grained control over key governance while maintaining compliance with overarching operator rules defined within the configurable governance layer.

Figure 5:
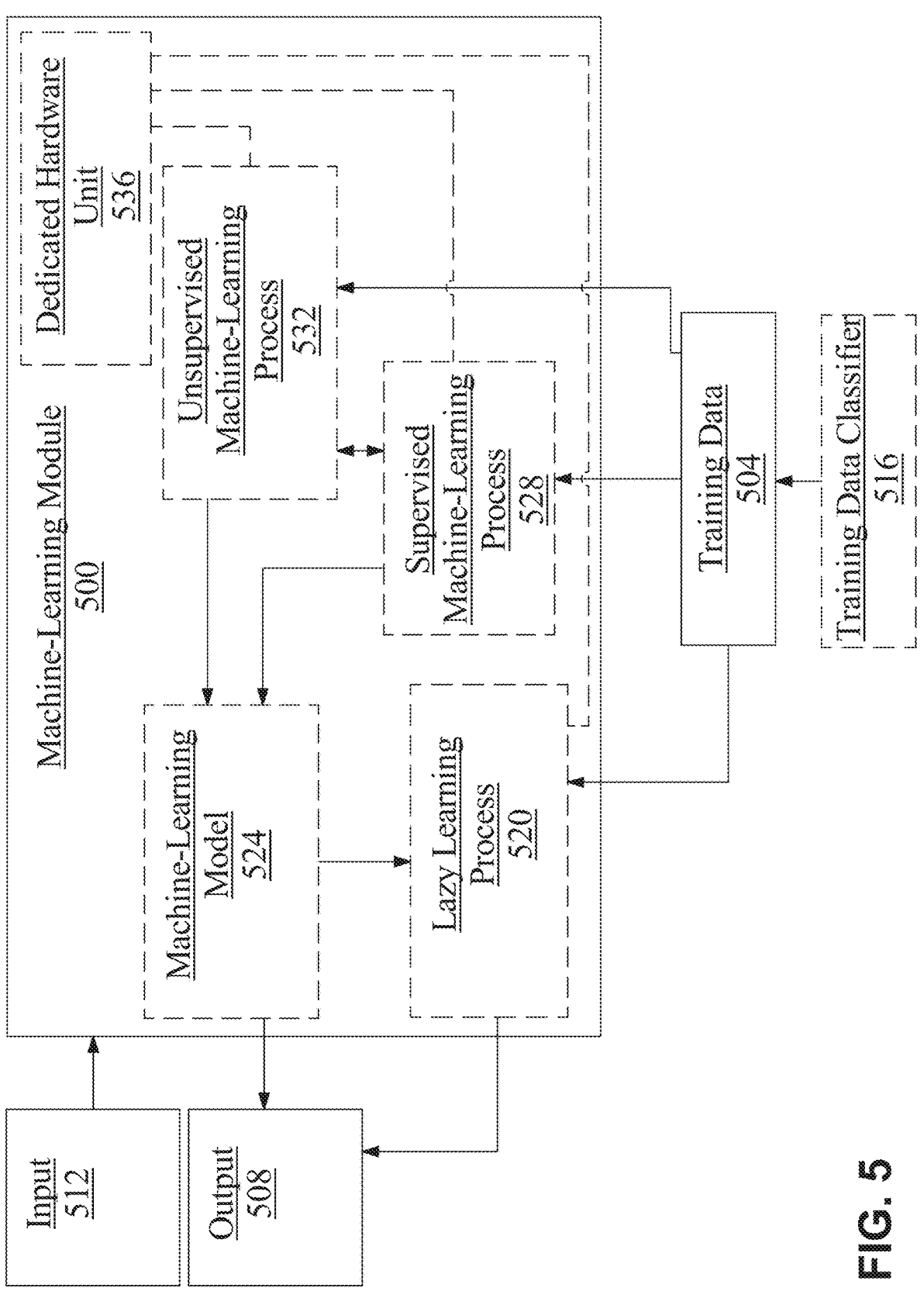
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, the input data may include an entity record containing entity protocols, at least a resource associated with a validation request, and historical consumption patterns linked to that entity. Without limitation, the output data may include a determined quantity of dual-key entitlements to be assigned, deducted, or decremented in connection with the resource. In a non-limiting example, the machine-learning module may process an input consisting of a tenant's entity record that specifies quota thresholds, an entity protocol defining key consumption rules, and a resource such as a parking session with demand metrics, and may output a computed quantity of dual-key entitlements, such as three prepaid entitlement keys or two operator-issued entitlement keys, required to satisfy the validation request. For example, without limitation, this correlation may allow the apparatus to automatically adjust entitlement allocation in real time based on learned relationships between entity protocols, resource characteristics, and historical validation outcomes.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to a cohort of entity records and associated member profiles, wherein the cohort is characterized by common attributes such as entity protocols, resource usage patterns, or key consumption behaviors, and wherein the cohort represents a sub-population of tenants and members for which a subset of training data may be selected. Without limitation, the classifier may identify subsets such as high-demand tenants that frequently approach quota-based thresholds, members with premium account types exhibiting elevated key usage, or resources associated with peak demand intervals. In a non-limiting example, training data classifier 516 may classify a subset of training data to tenants with enterprise-level accounts and their associated members who routinely consume more than eighty percent of their prepaid entitlement keys, thereby creating a focused dataset for refining the predictive determination of quantities of dual-key entitlements. For example, without limitation, this classification enables the apparatus to train the machine-learning module to optimize entitlement allocation strategies for specific sub-populations within the governance system.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include entity record data containing entity protocols, member profile data, and resource demand metrics as described above as inputs, and a determined quantity of dual-key entitlements to be assigned, deducted, or decremented in connection with at least a resource as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
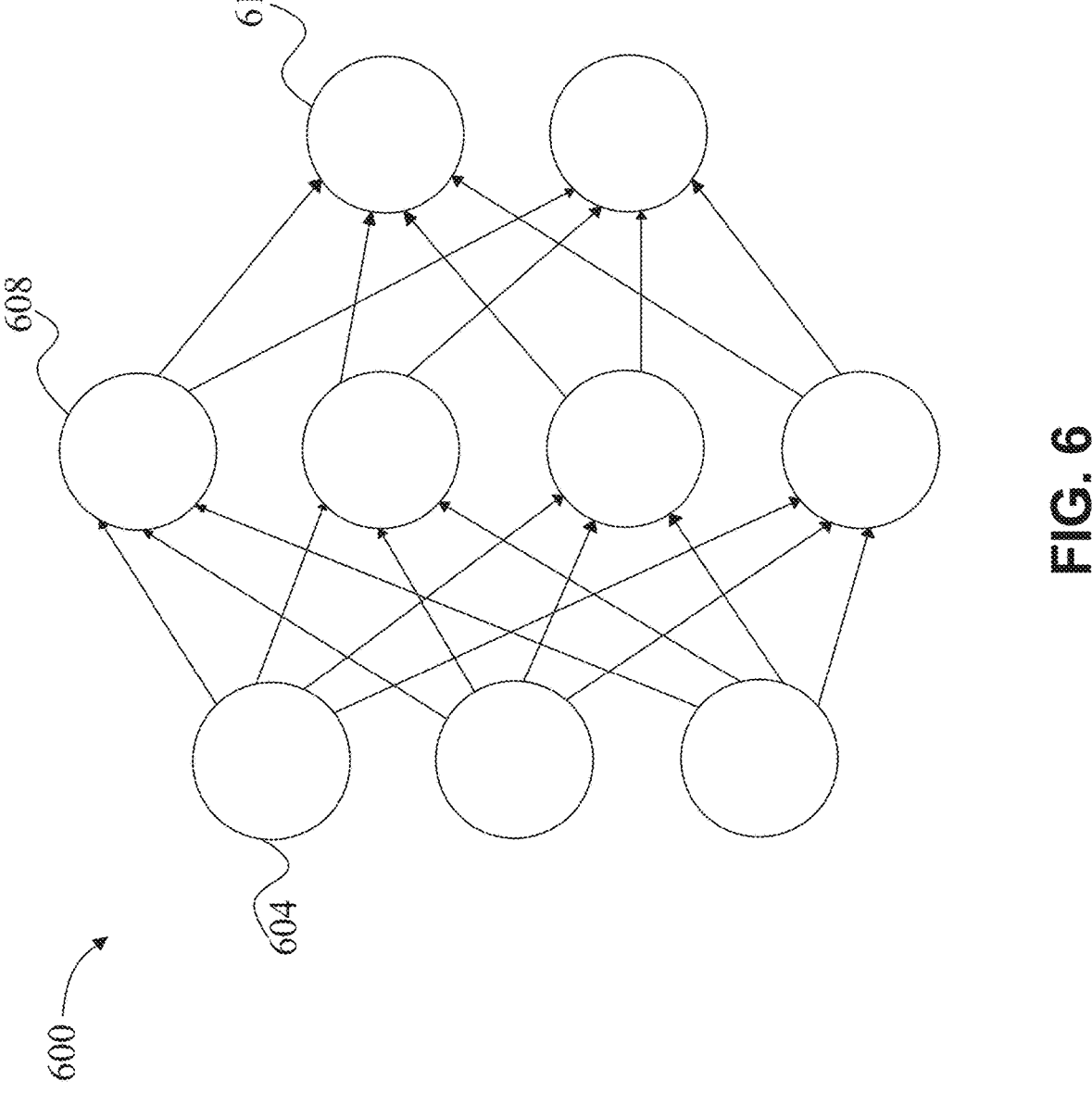
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
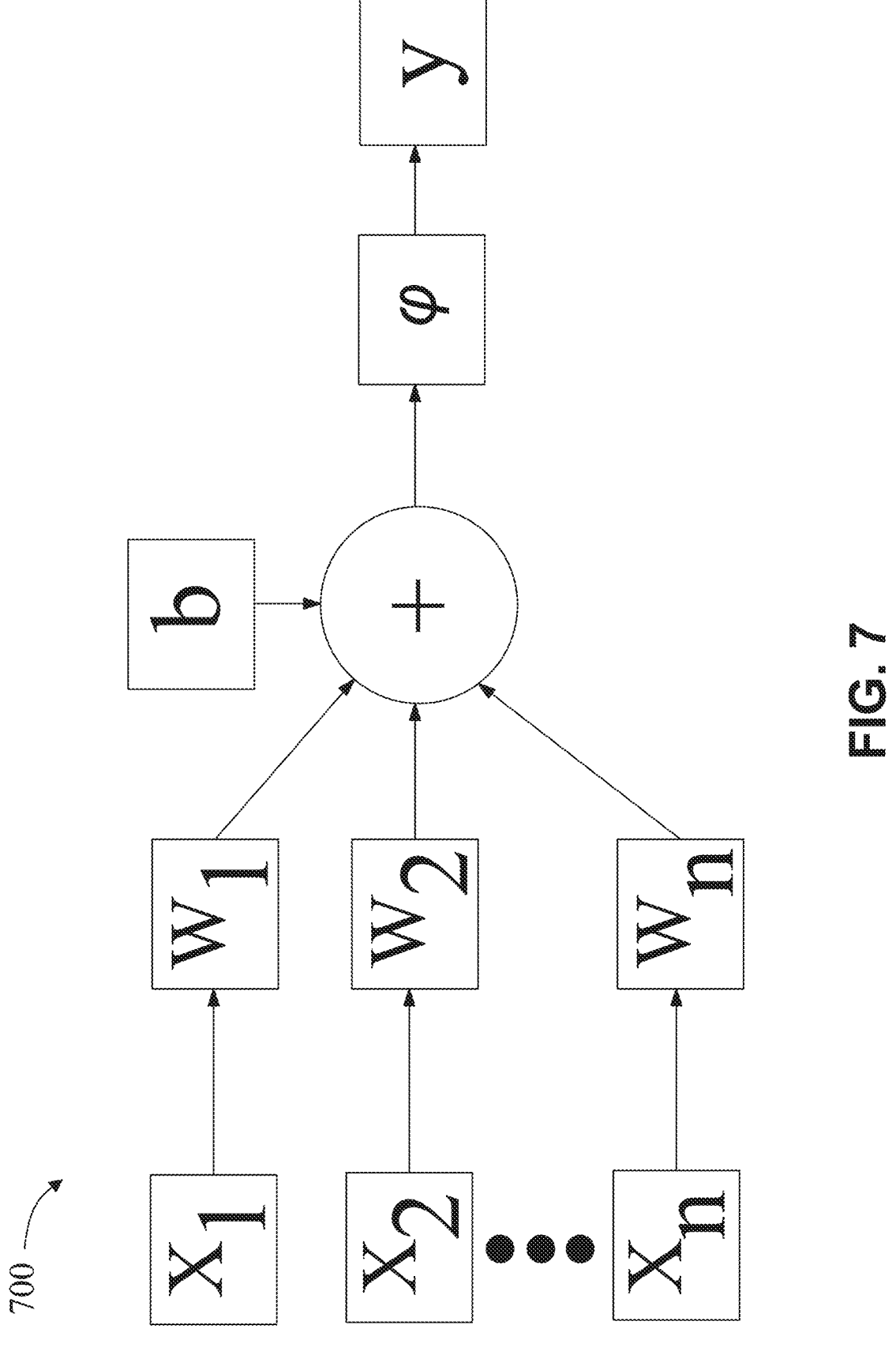
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function linear units function such as may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 8, a flow diagram of an exemplary method 800 for determining a quantity of dual-key entitlements to assign to at least a resource is illustrated. At step 805, method 800 includes instantiating, using at least a processor, a configurable governance layer comprising a plurality of configurable parameters, wherein at least an entity of a plurality of entities access the configurable governance layer using an entity profile and configure the plurality of configurable parameters. In an embodiment, the configurable governance layer may include a predetermined threshold. In an embodiment, the plurality of configurable parameters may include member profile data. This may be implemented as described and with reference to FIGS. 1-7.

Still referring to FIG. 8, at step 810, method 800 includes receiving, using the at least a processor, an assignment from one or more entities, wherein the assignment comprises at least validation data associated with the at least a resource and entity protocols associated with the entity. In an embodiment, the at least a processor is further configured to enforce a per-period cap associated with the entity protocols. In an embodiment, the at least a processor is further configured to enforce a per-event cap associated with the entity protocols. This may be implemented as described and with reference to FIGS. 1-7.

Still referring to FIG. 8, at step 815, method 800 includes determining, using the at least a processor, a quantity of the dual-key entitlements to assign to the at least a resource based on the assignment, the entity protocols, and at least a configurable parameter of the plurality of configurable parameters of the governance layer. In an embodiment, the at least a processor may be further configured to instantiate the configurable governance layer by loading, from the memory, governance rules defining entitlement key distribution, establishing, using the governance layer, at least a conversion rule for prepaid entitlement keys, and enforcing, using the governance layer, a quota-based threshold for operator-issued entitlement keys. In an embodiment, the at least a processor may be further configured to adjust the assignment of dual-key entitlements dynamically as a function of a resource demand. In an embodiment, the at least a processor may be further configured to generate a priority score associated with the assignment and rank a plurality of assignments based on the priority score. In an embodiment, the at least a processor may be further configured to settle the dual-key entitlements in real time by decrementing operator-issued entitlement keys. In an embodiment, the at least a processor may be further configured to settle the dual-key entitlements in real time by deducting prepaid entitlement keys from an entity record. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
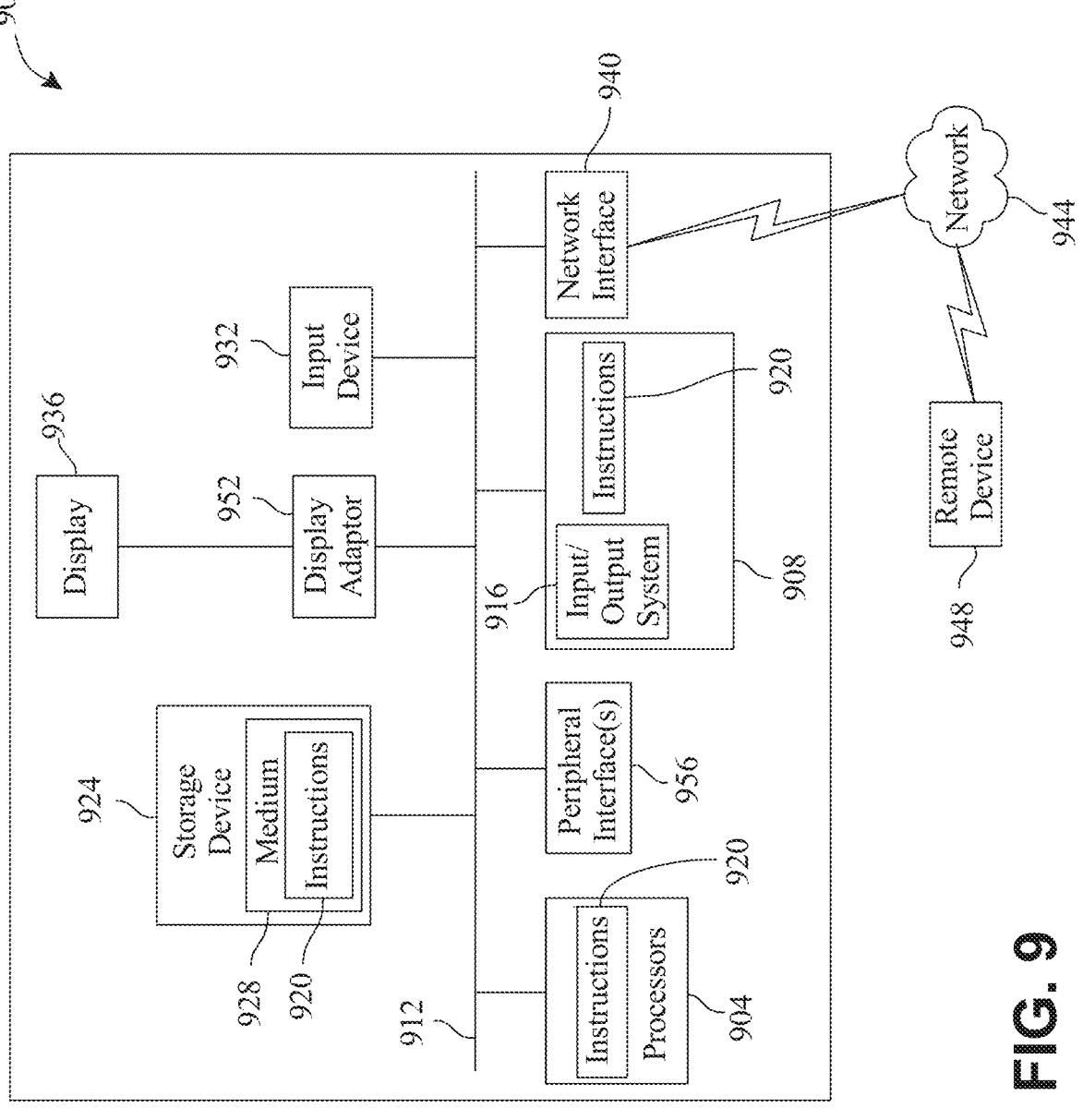
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a quantity of dual-key entitlements to assign to at least a resource, wherein the apparatus comprises:
    at least a computing device, wherein the computing device comprises:
    a memory; and
    at least a processor communicatively connected to the memory, wherein the memory contains instructions configuring the at least a processor to:
        instantiate, using the at least a processor, a configurable governance layer comprising a plurality of configurable parameters, wherein at least an entity of a plurality of entities:
            access the configurable governance layer using an entity profile; and
            configure the plurality of configurable parameters;
        receive, using the at least a processor, an assignment from one or more of the plurality of entities, wherein the assignment comprises at least validation data associated with the at least a resource and entity protocols associated with the entity;
        determine, using the at least a processor, a quantity of dual-key entitlements to assign to the at least a resource based on the assignment, the entity protocols, and at least a configurable parameter of the plurality of configurable parameters of the governance layer.

2. The apparatus of claim 1, wherein:
    the entity protocols comprise:
        a plurality of operator entity protocols; and
        a plurality of tenant entity protocols; and
    determining the quantity of dual-key entitlements to assign to the at least a resource comprises:
        assigning a first quantity of a first key as a function of the plurality of operator entity protocols; and
        assigning a second quantity of a second key as a function of the plurality of tenant entity protocols.

3. The apparatus of claim 1, wherein the at least a processor is further configured to instantiate the configurable governance layer by:
    loading, from the memory, governance rules defining entitlement key distribution;
    establishing, using the governance layer, a conversion rule for prepaid entitlement keys; and
    enforcing, using the governance layer, a quota-based threshold for operator-issued entitlement keys.

4. The apparatus of claim 1, wherein the plurality of configurable parameters comprises member profile data.

5. The apparatus of claim 1, wherein the at least a processor is further configured to adjust the assignment of dual-key entitlements dynamically as a function of a resource demand.

6. The apparatus of claim 1, wherein the at least a processor is further configured to enforce a per-period cap associated with the entity protocols.

7. The apparatus of claim 1, wherein the at least a processor is further configured to enforce a per-event cap associated with the entity protocols.

8. The apparatus of claim 1, wherein the at least a processor is further configured to:
    generate a priority score associated with the assignment; and
    rank a plurality of assignments based on the priority score.

9. The apparatus of claim 1, wherein the at least a processor is further configured to settle the dual-key entitlements in real time by decrementing operator-issued entitlement keys.

10. The apparatus of claim 1, wherein the at least a processor is further configured to settle the dual-key entitlements in real time by deducting prepaid entitlement keys from an entity record.

11. A method for determining a quantity of dual-key entitlements to assign to at least a resource, wherein the method comprises:
    instantiating, using at least a processor, a configurable governance layer comprising a plurality of configurable parameters, wherein at least an entity of a plurality of entities:
        access the configurable governance layer using an entity profile; and
        configure the plurality of configurable parameters;
    receiving, using the at least a processor, an assignment from one or more of the plurality of entities, wherein the assignment comprises at least validation data associated with the at least a resource and entity protocols associated with the entity;
    determining, using the at least a processor, a quantity of dual-key entitlements to assign to the at least a resource based on the assignment, the entity protocols, and at least a configurable parameter of the plurality of configurable parameters of the governance layer.

12. The method of claim 11, wherein:
    the entity protocols comprise:
        a plurality of operator entity protocols; and
        a plurality of tenant entity protocols; and
    determining the quantity of dual-key entitlements to assign to the at least a resource comprises:
        assigning, using the at least a processor, a first quantity of a first key as a function of the plurality of operator entity protocols; and
        assigning, using the at least a processor, a second quantity of a second key as a function of the plurality of tenant entity protocols.

13. The method of claim 11, further comprising instantiating, using the at least a processor, the configurable governance layer by:
    loading, from memory communicatively connected to the at least a processor, governance rules defining entitlement key distribution;
    establishing, using the governance layer, a conversion rule for prepaid entitlement keys; and
    enforcing, using the governance layer, a quota-based threshold for operator-issued entitlement keys.

14. The method of claim 11, wherein the plurality of configurable parameters comprise member profile data.

15. The method of claim 11, further comprising adjusting, using the at least a processor, the assignment of dual-key entitlements dynamically as a function of a resource demand.

16. The method of claim 11, further comprising enforcing, using the at least a processor, a per-period cap associated with the entity protocols.

17. The method of claim 11, further comprising enforcing, using the at least a processor, a per-event cap associated with the entity protocols.

18. The method of claim 11, further comprising:

generating, using the at least a processor, a priority score associated with the assignment; and ranking, using the at least a processor, a plurality of assignments based on the priority score.

19. The method of claim 11, further comprising settling, using the at least a processor, the dual-key entitlements in real time by decrementing operator-issued entitlement keys.

20. The method of claim 11, further comprising settling, using the at least a processor, the dual-key entitlements in real time by deducting prepaid entitlement keys from an entity record.

\* \* \* \* \*